(12) United States Patent
Husen et al.

(10) Patent No.: US 9,996,060 B2
(45) Date of Patent: Jun. 12, 2018

(54) CONTROLLING DEVICE AND METHOD FOR CONTROLLING POWER CONSUMPTION IN A SYSTEM OF POWER CONSUMING DEVICES

(75) Inventors: Sri Andari Husen, Eindhoven (NL); Ashish Vijay Pandharipande, Eindhoven (NL); Ludovicus Marinus Gerardus Maria Tolhuizen, Waalre (NL); Ying Wang, Eindhoven (NL); Meng Zhao, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 1146 days.

(21) Appl. No.: 14/007,346

(22) PCT Filed: Mar. 27, 2012

(86) PCT No.: PCT/IB2012/051447
§ 371 (c)(1),
(2), (4) Date: Sep. 25, 2013

(87) PCT Pub. No.: WO2012/137097
PCT Pub. Date: Oct. 11, 2012

(65) Prior Publication Data
US 2014/0025216 A1    Jan. 23, 2014

(30) Foreign Application Priority Data

Apr. 4, 2011   (EP) .................................... 11161060

(51) Int. Cl.
*G05B 13/02* (2006.01)
*H02J 3/14* (2006.01)
(Continued)

(52) U.S. Cl.
CPC ................ *G05B 13/02* (2013.01); *H02J 3/14* (2013.01); *H05B 37/0218* (2013.01);
(Continued)

(58) Field of Classification Search
CPC ..................................................... G05B 13/02
See application file for complete search history.

(56) References Cited

U.S. PATENT DOCUMENTS

| 4,324,987 A | * | 4/1982 | Sullivan, II | ............... H02J 3/14 307/35 |
| 4,916,328 A | * | 4/1990 | Culp, III | ................... H02J 3/14 307/39 |

(Continued)

FOREIGN PATENT DOCUMENTS

| EP | 0791280 B1 | 6/2002 |
| WO | 2010025307 A1 | 3/2010 |

OTHER PUBLICATIONS

Xiao, Lin et al "Distributed Average Consensus with Least-Mean-Square Deviation" Journal of Parallel and Distributed Computing, vol. 67, No. 1, 2007, pp. 33-46.

*Primary Examiner* — Carlos Ortiz Rodriguez
(74) *Attorney, Agent, or Firm* — Akarsh P. Belagodu

(57) ABSTRACT

The invention relates to controlling power consumption of a group of plurality of groups of power consuming devices by determining power consumption control value for controlling power consumption of devices of the group by use of at least one of the following: load shedding flexibility value of at least one group of plurality of groups, wherein the load shedding flexibility value of the corresponding group indicates maximum amount of power, by which power consumption of devices of the corresponding group can be reduced such that minimum power consumption permissible in the corresponding group is maintained; load restoration flexibility value of the at least one group of plurality of groups, wherein the load restoration flexibility value of the corresponding group indicates maximum amount of power, by which the power consumption of devices of the corresponding group can be increased such that maximum power (Continued)

consumption permissible in the corresponding group is maintained.

20 Claims, 9 Drawing Sheets

(51) Int. Cl.
*H05B 37/02* (2006.01)
*H02J 13/00* (2006.01)

(52) U.S. Cl.
CPC ..... *H05B 37/0227* (2013.01); *H05B 37/0245* (2013.01); *H02J 13/0013* (2013.01); *Y02B 20/46* (2013.01); *Y02B 70/3225* (2013.01); *Y02B 70/3283* (2013.01); *Y02B 90/2607* (2013.01); *Y02E 40/76* (2013.01); *Y04S 10/545* (2013.01); *Y04S 20/222* (2013.01); *Y04S 20/246* (2013.01); *Y04S 40/12* (2013.01)

(56) References Cited

U.S. PATENT DOCUMENTS

| | | |
|---|---|---|
| 2005/0038571 A1 | 2/2005 | Brickfield |
| 2005/0102068 A1 | 5/2005 | Pimputkar |
| 2009/0315400 A1 | 12/2009 | Howe |
| 2010/0088261 A1 | 4/2010 | Montalvo |

\* cited by examiner

CONTROLLING DEVICE AND METHOD FOR CONTROLLING POWER CONSUMPTION IN A SYSTEM OF POWER CONSUMING DEVICES

CROSS-REFERENCE TO PRIOR APPLICATIONS

This application is the U.S. National Phase application under 35 U.S.C. § 371 of International Application No. PCT/IB2012/051447, filed on Mar. 27, 2012, which claims the benefit of European Patent Application No. 11161060.6, filed on Apr. 4, 2011. These applications are hereby incorporated by reference herein.

FIELD OF THE INVENTION

The invention relates to controlling power consumption in a system comprising power consuming devices. Particularly, the invention refers to a controlling device configured for controlling the power consumption and to a corresponding method. Additionally, the present invention relates to a system comprising the controlling device and to a computer program product configured for performing the steps of the method.

BACKGROUND OF THE INVENTION

In following, the present invention is described exemplary with regard to lighting systems as an example for a system comprising power consuming devices and with regard to lighting devices as the power consuming devices. However, it has to be pointed out that the present invention can be applied correspondingly also to further systems having power consuming devices like heating systems or air conditioning systems, for example, or to a combination of such systems, for example, a system comprising lighting devices, heating devices and air conditioning devices.

Lighting systems are known to consume a large proportion of energy or power in buildings and, more generally, in city infrastructures and may be seen as cause for high energy or power consumption. Therefore, lighting systems are often configured as controllable loads to offer dynamic load control services such as demand response in smart grids. By implementing lighting systems as controllable loads, by control of which it is ensured that the consumed electrical load or power consumption is less than what can be generated and/or provided, lighting systems may provide load/demand reductions or restorations to the smart grid.

In current lighting systems, lamps or lighting devices are often uniformly and simultaneously dimmed by use of dimmable ballasts for a period of time. Thereto, simple power line broadcasting mechanisms may be used for controlling (dimming) the lamps or lighting devices of the lighting systems.

The amount of electricity generated and transmitted by the electricity grid must match at any time the electricity consumed by loads at the other end of the grid to ensure stability of the electricity grid. In known control systems, this is mainly achieved by adjusting the electricity generation to match the actual consumption. However, in several periods of time (e.g., during hot summer days), the electricity demand exceeds the generation capacity (e.g., due to intensive operating of air conditioning systems). Curtailment is then deployed to ensure that the grid can still deliver power generated under the available generation capacity.

Usually, curtailment is done by the grid operator by manually disconnecting a distribution branch of the grid, deeming all loads served by the branch unusable during the curtailment period. Alternatively, grid customers can selectively and individually disconnect some loads from the grid. However, coordination and agreement between the grid customers and the grid operators on factors like the amount and duration of reduction, for example, is required. This necessitates reliable communication means between the grid operator and the customers. Furthermore, incentives and settlements may be needed to reward the customers. Hence, this approach is applicable only to a handful of large utility customers, typically, large industrial customers, which can supply a significant amount of reduction.

Due to the recent rapid developments in the area of communications technology, it is possible to connect a vast number of customers to the grid operator to deploy an orchestrated load shedding. Also economically, it has become more feasible to develop such infrastructure as the gap between the available generation and peak demand widens, driving up electricity or power costs. Currently, a number of demand response programs are operational in various states of the USA (e.g. California, Texas, New York), supplying reduction of the peak demand. Demand response will play an even more important role in the future Smart Grid to balance an increasingly dynamic grid due to growing integration of highly variable renewable energy or power resources.

On the facility level, participation in the demand response program requires actively controlling the load to ensure meeting the targeted demand reduction. Active load control may also benefit facilities not taking part in the demand response program as it can reduce the total cost of the consumed electricity or power. For instance, many utility companies also apply peak demand charge based on the peak power consumption during the billing period in addition to the charge for the energy consumption. Proper control of peak demand may reduce costs of electricity incurred by user(s). Active load control may also be used to take advantage of dynamic tariff pricing.

US 2010/0088261 A1 refers to a method of load shedding to reduce the total power consumption of a load control system.

SUMMARY OF THE INVENTION

It is an object of the present invention to provide a methodology for an efficient and effective controlling of power consumption in systems with power consuming devices.

The object is achieved by the features of the independent claims.

The invention is based on the idea that control of power consumption in a system comprising power consuming devices like lighting devices, for example, can be performed by determining power consumption changes (reduction or increase) for each of the currently consuming energy devices based on the amount of power required by and/or permissible for the devices to provide user-acceptable service levels, i.e. (illumination) requirements acceptable and desired by the user (at certain time periods), with regard to a required or targeted system power consumption. Further, according to the present invention devices, which are co-located in an area/space, e.g. in a particular room like office room, for example, are controlled as a group rather than as individual devices. Thus, the power consumption control may be performed over plurality of groups of devices, on top of various local control mechanisms/modes of each groups. Such group oriented control may be, for example, manual switching or occupancy based control. Furthermore, the group oriented power consumption control may have adjustment mechanisms to account for daylight. In general, a group comprises at least one power consuming device. To this, a group may contain a single (one) device, if it is deemed necessary from the local control purposes, or a plurality of devices. Further, acceptable service levels may vary throughout the time, since through the time the devices may be used for different purposes, e.g. reading task, or the environmental conditions of the devices like daylight levels, for example, may change through the time. To this, several modes may be defined with regard to each or at least one of the groups, said modes specifying power consumption and, thus, illumination levels permissible for the devices of the corresponding group for a certain or predetermined period of time. The steps of the present invention may be performed automatically by considering illumination and, thus, power consumption requirements (according to a present or current local control mode) of each group, for example, by taking into account the occupancy of the location, where a lighting device is placed, and/or the amount of incoming daylight in the location Particularly, a control mode may comprise as specified (illumination or power consumption) requirements for a group, for example, at least one of the following: certain or predefined light levels permissible or required the group; certain or predefined power consumption levels permissible or required for the group; minimum power consumption permissible or required for the group; minimum light level permissible or required for the group; maximum power consumption permissible or required for the group; maximum light level permissible or required for the group. Controlling power consumption comprises power consumption reduction or increase. Further, it has to be pointed that the power consumption of a lighting device is in relation with the light level of the lighting device, wherein a higher power consumption is related to a higher light level and a lower power consumption is related to a lower light level. According to the present invention, for each group of power consuming devices, a range of user-acceptable service levels to be provided by the energy consuming devices in the group (or area) are configured/specified for each local control mode. When a power consumption change is required, the distribution of power changes for each of the area or group is determined based on the required power levels to provide the user-acceptable service levels (for the current local control mode of each of the area or group) and the required system level power change. Additionally, also factors like the current power consumption of each of the area or group, the current power consumption of controllable (and, if required, non-controllable) devices and/or the target power consumption of controllable (and, if required, non-controllable) devices may be used for power consumption control according to the present invention.

With the present invention, a plurality of advantages can be achieved. Since the actual amount of power reduction or increase is based on the required power reduction or increase (and not on a preset power reduction or increase), the power reduction or increase is more precise (hence, the compromise to user comfort is kept to minimum), the required power reduction or increase is achieved fast (possibly in a single step). Further, the methodology of the present invention does not require a complicated implementation and is simple. For at least one group of the lighting system or for control mode(s) of the at least one group of the lighting system, the method requires a specification of maximum and/or minimum illumination levels or maximum and/or minimum power consumption levels, respectively. Further, values like the system power consumption and the target power consumption may be used. Thus, according to the present invention, comparatively few data has to be processed for controlling at least one device of the lighting system so that a computing time and space efficient power consumption control is enabled. Moreover, the present invention allows a flexible control of power consumption. The controlling device may be programmed in various ways and may choose an appropriate process for determining power consumption control values to be used from a plurality of different processes, depending on certain criteria, e.g. the amount of power reduction. Further, daylight level can be accounted for by the re-computation of the maximum and minimum power consumption.

In one aspect of the present invention, a controlling device is provided, which is configured to control power consumption of a group of a plurality of groups of power consuming devices of a system of the power consuming devices, wherein the controlling device is adapted to determine a power consumption control value for controlling power consumption of devices of the group by use of at least one of the following:

a load shedding flexibility value of at least one group of the plurality of groups, wherein the load shedding flexibility value of the corresponding group indicates a maximum amount of power, by which power consumption of devices of the corresponding group can be reduced such that minimum power consumption permissible in the corresponding group is maintained;

a load restoration flexibility value of the at least one group of the plurality of groups, wherein the load restoration flexibility value of the corresponding group indicates a maximum amount of power, by which the power consumption of devices of the corresponding group can be increased such that a maximum power consumption permissible in the corresponding group is maintained.

In this way, a flexible user-requirements based power consumption control is achieved, which can be performed in a fast and efficient way. Further, an optimal matching is enabled between the power consumption permissible and the power consumption required with regard to actual and current requirements of users.

According to an embodiment of the present invention, the controlling device is configured to determine the power consumption control value such that, when changing power consumption of the group by use of the power consumption control value, a difference between a current power consumption amount in the system and a target system power consumption amount, to which the power consumption in the system is intended to be changed, is minimized.

According to an embodiment of the present invention, the controlling device is a central controller configured to control power consumption of the plurality of groups or a group controller configured to control power consumption of the group.

According to an embodiment of the present invention, if the controlling device is a group controller, the group controller is configured to determine information related to the load shedding flexibility value and/or information related to the load restoration flexibility value of the group controlled by the group controller.

According to an embodiment of the present invention:
if the controlling device is the central controller, the central controller is configured to determine for each group of the plurality of groups a corresponding power consumption control value for controlling power consumption of devices of the corresponding group by use of at least one of the following: the load shedding flexibility values or the load restoration flexibility values of the plurality of groups, wherein the corresponding power consumption control values of the plurality of groups are determined such that a corresponding power shedding in the corresponding group is equal or less the corresponding load shedding flexibility value of the corresponding group or a corresponding power restoration in the corresponding group is equal or less the corresponding load restoration flexibility value of the corresponding group;

if the controlling device is the group controller, the power consumption control value of the group is determined by the group controller based on its own load shedding flexibility value or load restoration flexibility value and based on target system power consumption change value and based on an estimate of a sum of load shedding flexibility values or load restoration flexibility values of other groups of the system.

According to an embodiment of the present invention, if the controlling device is the central controller, the corresponding power consumption control values of the plurality of groups are determined such that a change of power consumption of each of the groups by the corresponding power consumption control value results in a power consumption change of the system, which corresponds to the target system power change value.

According to an embodiment of the present invention, the controlling device is configured to receive from the at least one of the plurality of groups information related to the load shedding flexibility value of the corresponding group and/or information related to the load restoration flexibility value of the corresponding group. According to an embodiment of the present invention, said receiving is performed if the controlling device is the central controller.

According to an embodiment of the present invention, the controlling device is configured to transmit to the at least one of the plurality of groups a request message requesting transmitting the information related to the load shedding flexibility value of the corresponding group and/or information related to the load restoration flexibility value of the corresponding group. According to an embodiment of the present invention, said receiving is performed if the controlling device is the central controller.

According to an embodiment of the present invention, if the controlling device is the group controller, the controlling device is configured to estimate or receive an average or a sum of the load shedding flexibility values and/or of the load restoration flexibility values of the at least one other group.

According to an embodiment of the present invention, if the controlling device is the central controller, the controlling device is configured to determine for the at least one of the plurality of groups the load shedding flexibility value by use of information related to the load shedding flexibility value and/or the load restoration flexibility value by use of information related to the load restoration flexibility value.

According to an embodiment of the present invention:
if the controlling device is the central controller, the controlling device is configured to transmit to the group the power consumption control value for controlling power consumption of devices of the group;
if the controlling device is the group controller, the controlling device is configured to control the power consumption of devices of the group by use of the determined corresponding power consumption control value.

According to an embodiment of the present invention, the power consumption control value indicates reduction or increase of the power consumption in the group.

According to an embodiment of the present invention, the controlling device is configured to determine the power consumption control value of the group by use of:
the load shedding flexibility value of the at least one group if a target system power change value, by which power consumption in the system is intended to be changed, indicates that the power consumption of the system is to be reduced; or
the load restoration flexibility value of the at least one group if the target system power change value, by which the power consumption in the system is intended to be changed, indicates that the power consumption of the system is to be increased.

According to an embodiment of the present invention, the power consumption control value of the group comprises at least one of following: a value indicating the target power consumption in the group; a value indicating how much the power consumption in the group is to be reduced or increased; a factor value, which, multiplied with the load shedding flexibility value of the group, results in a value indicating how much the power consumption in the group is to be reduced or, multiplied with the load restoration flexibility value of the group, results in a value indicating how much the power consumption in the group is to be increased; an operating parameter indicating how each of the power consuming devices in the group should be operated.

According to an embodiment of the present invention, the controlling device is configured to transmit:
a message indicating that a target system power change value, by which power consumption in the system is intended to be reduced, cannot be achieved in such a way that for each of the at least one group of the plurality of groups the corresponding minimum power consumption permissible in the corresponding group is maintained, and/or
a message indicating that the target system power change value, by which power consumption in the system is intended to be increased, cannot be achieved in such a way that for each of the at least one gropu of the plurality of groups the corresponding maximum power consumption permissible in the corresponding group is maintained.

According to an embodiment of the present invention, for each of the least one group of the plurality of groups, the corresponding load shedding flexibility value and/or the corresponding load restoration flexibility value is a value, which has been determined by use of information referring to at least one of the following: location of the devices of the corresponding group; occupancy of location of devices of the corresponding group; amount of daylight around the devices of the corresponding group.

In one aspect of the present invention, a method is provided, which is configured for controlling power consumption of a group of a plurality of groups of power consuming devices of a system of the power consuming devices, wherein the method comprises determining a power consumption control value for controlling power consumption of devices of the group by use of at least one of the following:
a load shedding flexibility value of at least one group of the plurality of groups, wherein the load shedding flexibility value of the corresponding group indicates a maximum amount of power, by which power consumption of devices of the corresponding group can be reduced such that a minimum power consumption permissible in the corresponding group is maintained; a load restoration flexibility value of the at least one group of the plurality of groups, wherein the load restoration flexibility value of the corresponding group indicates a maximum amount of power, by which the power consumption of devices of the corresponding group can be increased such that a maximum power consumption permissible in the corresponding group is maintained. In this way, the achievement of advantages and effects of the present invention is supported.

Particularly, said method comprises steps performed by the controlling device as outlined above and described in more detail below. Thus, the method may be performed by a controlling device like a group controller or central controller, for example.

In a further aspect of the present invention, a system is provided, which comprises a controlling device as outlined above and described in more detail below.

In another aspect of the present invention, a computer program product is provided, which comprises code configured for performing the steps of said method as outlined above and described in more detail below when run on a device configured for executing the computer program product. The device may be the controlling device as outlined above and described in more detail below. Particularly, the device may be arranged such that it comprises the computer program product. The structure of the device may be arranged or adapted such that it allows execution of the computer program product.

In this way, an efficient and effective power consumption control is enabled, which with high accuracy takes into consideration user requirements set out with regard to both the (lighting) system as whole and specific parts of the (lighting) system, which is simple and implementable in a fast and flexible way without wasting system resources, by considering the current power consumption and currently allowed or permitted power consumption with high accuracy. Particularly, the present invention as described and as claimed in (independent) claims enables achievement of all advantages and effects described herein with regard to the present invention.

DETAILED DESCRIPTION OF THE EMBODIMENTS

Figure 1:
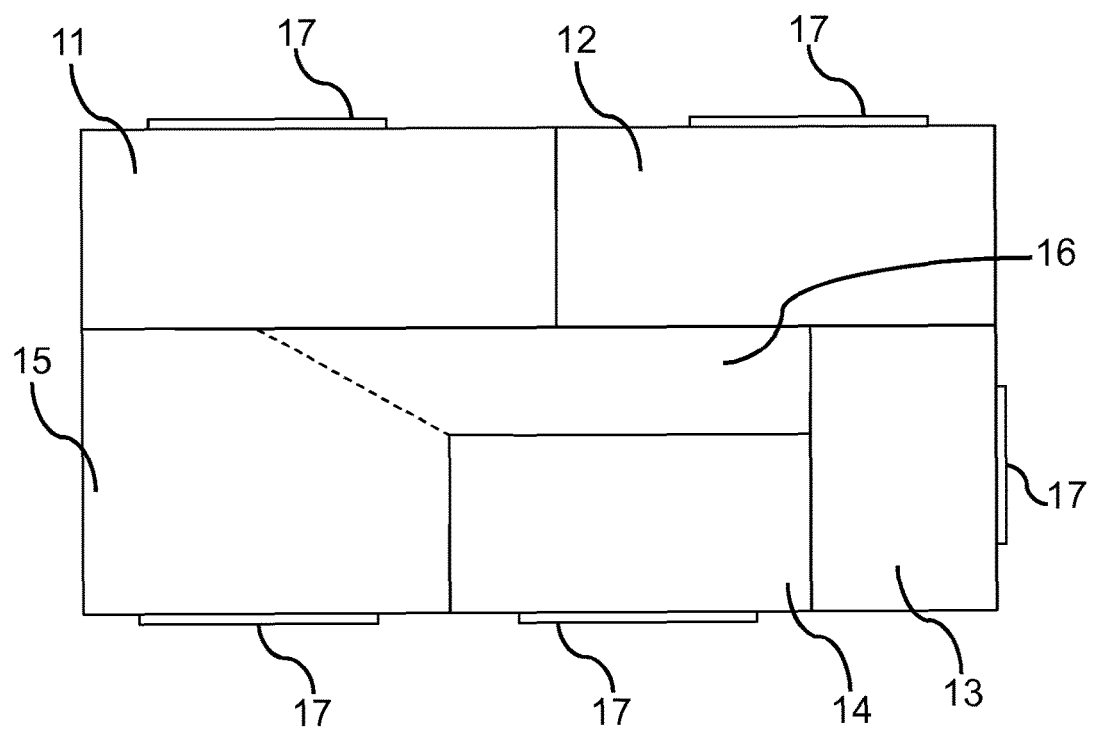
FIG. 1 illustrates an exemplary environment where the present invention can be implemented.

FIG. 1 illustrates an exemplary environment where the present invention can be implemented. Particularly, FIG. 1 illustrates a plan of a building that is sub-divided into different areas like corridor 16, workspace 11, 12, 13, 14 and reception 15, for example, that serve different purposes. A lighting system, comprising a plurality of lighting devices, is implemented in the several areas 11-16. Each functional area 11-16 may have different illumination requirements. Further, each functional area 11-16 may have a different flexibility towards load shedding, i.e. powering down the load or illumination level reduction. For example, some areas like the corridor 16, may tolerate illumination reduction up to 50% while other areas like the workspace 11, 12, 13, 14 or reception 15, for example, may tolerate illumination reduction up to 20%.

According to the present embodiment, the lighting system may comprise controllable and non-controllable loads, i.e. lighting devices, energy consumption of which can be controlled for ensuring that the energy consumed by the system is less than what can be generated or provided, and lighting devices, energy or load consumption of which cannot be controlled. In following, for the ease of description, a lighting system with only controllable loads, i.e. with controllable lighting devices will be considered, wherein it has to be noted that the present invention can be applied also to a system comprising additionally non-controllable loads or lighting devices.

According to the present embodiment, the lighting devices of the lighting system are grouped into K groups (K>0 (e.g., K≥2)), each of said groups consisting of one or more controllable loads or lighting devices respectively. According to an embodiment, lighting devices of a group may serve an area like the corridor 16, office room 11-14 or reception 15, for example. According to a further embodiment, a group can comprise also energy consuming devices in several areas or sub-area, if required, depending on the user requirements, e.g., the devices may be grouped in devices near windows and devices near walls in office rooms. In general, the present invention allows different assignments of lighting devices to the K groups.

Figure 2:
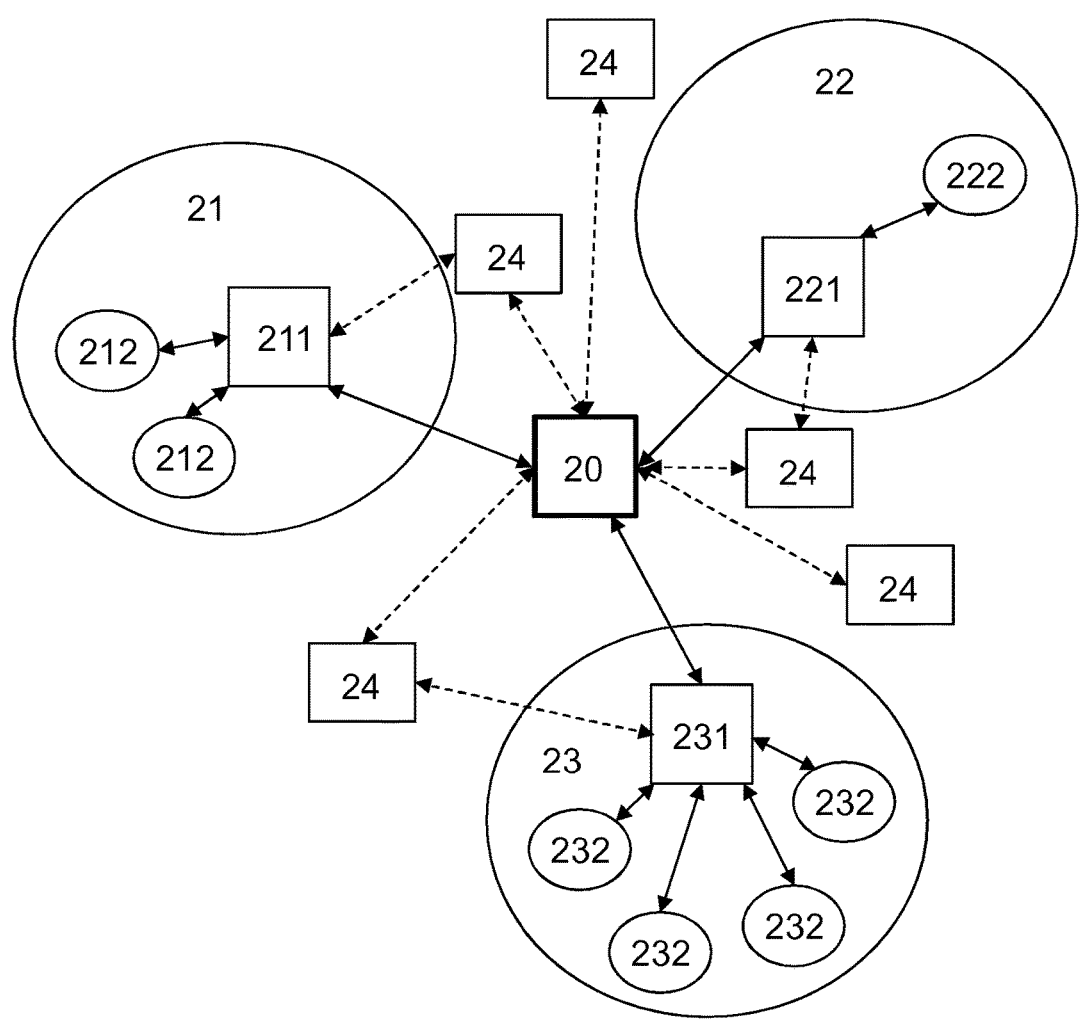
FIG. 2 illustrates a lighting system according to an embodiment of the present invention.

FIG. 2 illustrates a lighting system according to an embodiment of the present invention, wherein a centralized architecture is implemented according to the present embodiment. As shown in FIG. 2, the system comprises lighting devices 212, 222, 232 divided into three groups 21, 22, 23. Further, according to the present embodiment, each group 21, 22, 23 has a controller 211, 221, 231, referred in following to also as group controller, each of the group controllers 211, 221, 231 being configured for controlling the energy consumption and, thus, also illumination levels of the corresponding lighting devices 212, 222, 232 belonging to the corresponding group 21, 22, 23 of the respective group controller 211, 221, 231. The required illumination levels and, thus, the energy consumption levels for the lighting devices 212, 222, 232 are determined according to the present embodiment by taking into account information like occupancy status, daylight levels, tasks performed in the area, for example. Said information for determining the illumination and, thus, energy consumption levels can be obtained, for example, from occupancy sensors, daylight sensors and/or corresponding user inputs. Moreover, the system may comprise an electricity power-sensing unit measuring the power consumption of the system. In FIG. 2, the several sensor units like the above mentioned occupancy sensors, daylight sensors or the power-sensing unit are visualized exemplary by components 24 for simplifying the representation of the system, wherein it is clear that different arrangements of different sensor units with regard to their locations in the system are possible according to the present invention.

Further, according to the present embodiment, the system comprises a central controller 20, which controls the power consumption of the system. The central controller 20 can control the power or energy consumption of the system by performing corresponding communications with the group controllers 211, 221, 231, as indicated by the arrows between the central controller 20 and the group controllers 211, 221, 231 in FIG. 2. In line with the centralized architecture of the present embodiment, the central controller 20 represents an exemplary controlling device according to the present invention. Thus, the central controller 20 is configured to control power consumption of each group 21, 22, 23 by determining corresponding power consumption control value for each of groups 21, 22, 23 of the lighting system. Additionally, according to the present embodiment, the central controller 20 is configured to control power consumption of each group 21, 22, 23 by transmitting the corresponding power consumption control value to each of the groups 21, 22, 23. After receiving the corresponding power consumption control value, each of the groups 21, 22, 23 will control or adjust, respectively, the power consumption of the corresponding group 21, 22, 23 by use of the corresponding power consumption control value, wherein the power consumption of the corresponding group 21, 22, 23 will be reduced (i.e., shed) or increased (i.e., restored) by use of the corresponding power consumption control value.

Additionally, according to the present embodiment, the system comprises communications means like communications network or system, for example, for information exchange between controllers 20, 211, 221, 231, sensors 24 and the lighting devices 212, 222, 232 (power consuming devices). The corresponding communications means is outlined exemplary in FIG. 2 by different arrows between the corresponding components, wherein several ways of communications (also such not shown) can be implemented according to the present invention.

The group controllers 211, 221, 231 may be devices or entities arranged as separate devices or arranged as parts of devices, which are different from the lighting devices 212, 222, 232, as shown in FIG. 2. The group controllers 211, 221, 231 may also be devices or entities arranged in one of the lighting devices 212, 222, 232 of the corresponding group 21, 22, 23, which they are controlling, i.e. as a part of the lighting devices 212, 222, 232.

Figure 3:
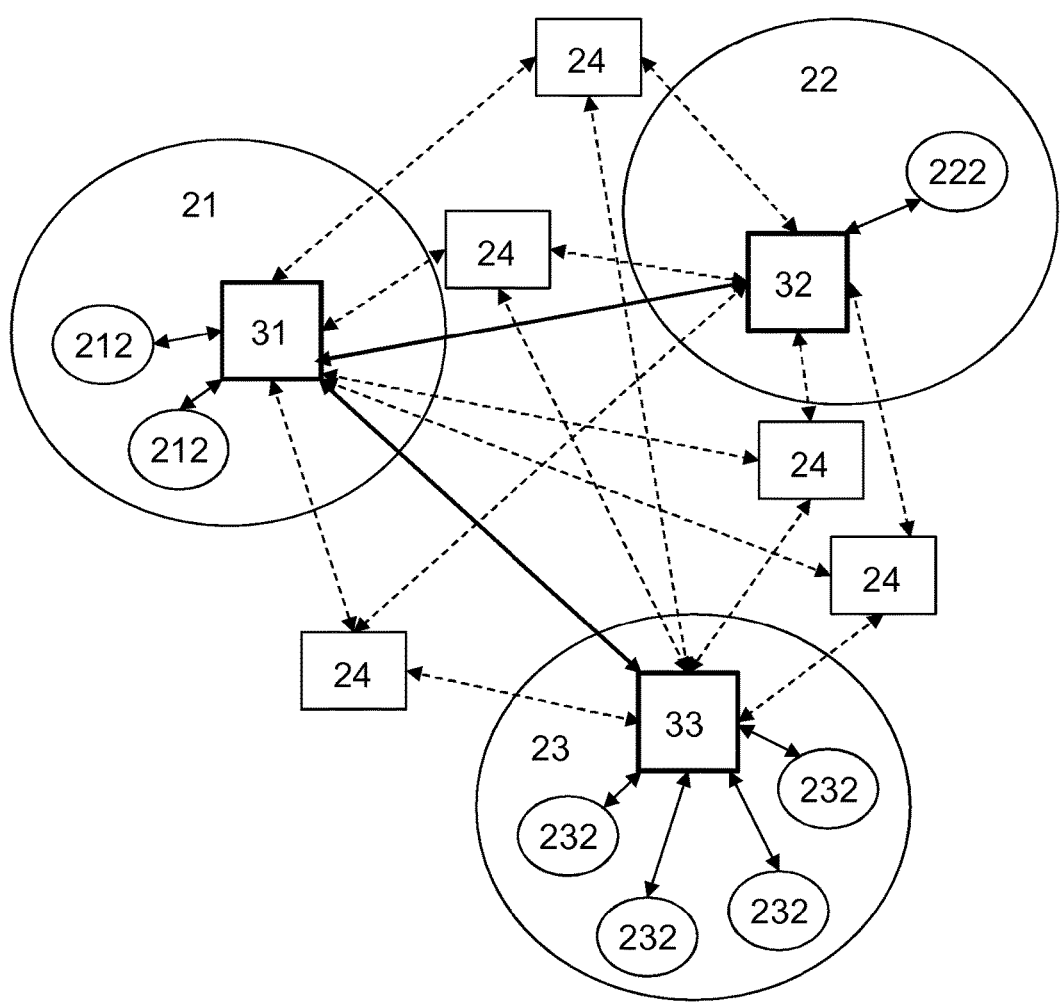
FIG. 3 illustrates a lighting system according to an embodiment of the present invention.

FIG. 3 illustrates a lighting system according to another embodiment of the present invention, wherein a distributed architecture is implemented according to the present embodiment. In comparison with the centralized architecture of FIG. 2, in the distributed architecture of FIG. 3, no central controller 20 is provided. In line with the distributed architecture of the present embodiment, each of the group controllers 31, 32, 33 represents an exemplary controlling device according to the present invention. Thus, each of the group controllers 31, 32, 33 is configured to control power consumption of its group 21, 22, 23, which the group controller 31, 32, 33 controls, by determining a corresponding power consumption control value for its group 21, 22, 23. Additionally, according to the present embodiment, each of the group controllers 31, 32, 33 is configured to control power consumption of its group 21, 22, 23 by adjusting the power consumption of its group 21, 22, 23 by use of the corresponding determined power consumption control value, wherein the power consumption of the corresponding group 21, 22, 23 is reduced (i.e., shed) or increased (i.e., restored) by use of the corresponding determined power consumption control value.

For controlling power consumption, each of the group controllers 31, 32, 33 may be connected to at least one another group controller 31, 32, 33 for communicating information or data, which is relevant for controlling power consumption according to the present invention and which refers to the another group 21, 22, 23 controlled by the respective another group controller 31, 32, 33. Each of the group controllers 31, 32, 33 is configured to determine the corresponding determined power consumption control value for its group by use of information or data on its own group 21, 22, 23 and by use of information or data on at least one another group 21, 22, 23, which is controlled by an another group controller 31, 32, 33. The information or data on at least one another group 21, 22, 23 may be estimated by the controlling group controller 31, 32, 33 and/or may be received (at a current or an earlier point of time) by the controlling group controller 31, 32, 33 from the corresponding another group controller 31, 32, 33.

According to the present embodiment, group controllers 31 and 32, 31 and 33 may communicate with each other, wherein no connection for communication is provided between the group controllers 32 and 33. According to an embodiment of the present invention, when controlling power consumption in the corresponding group 21, 22, 23 and determining the corresponding power consumption control value and when taking into consideration information on another groups 21, 22, 23, to which a communications connection exists, the group controller 31 will use also (received) information on groups 22 and 23, besides the information on its own group 21, and each of the group controllers 32, 33 will use (receive) information on group 21 only, besides the information on their own groups 22, 23. According to a further embodiment of the present invention, each of the group controllers 31, 32, 33 may use estimated information on at least one of another groups 21, 22, 23, besides the information on the own group 21, 22, 23, for determining the corresponding power consumption control value. According to another embodiment of the present invention, both the received information and estimated information on at least one of the another groups 21, 22, 23 may be used by a controlling group controller 31, 32, 33 for determining the corresponding power consumption control value, besides the information on its own group 21, 22, 23. The term "at least one another group" may refer to any number of groups between 1 and K−1, wherein K is the total number of groups in the system.

Further, according to the present embodiment, each group controller 31, 32, 33 is configured to communicate with corresponding occupancy sensors, daylight sensors or the power sensing units visualized exemplary by components 24, as already explained with regard to FIG. 2.

The group controllers 31, 32, 33 may be devices or entities arranged as separate devices or arranged as parts of devices, which are different from the lighting devices 212, 222, 232, as shown in FIG. 2. The group controllers 31, 32, 33 may also be devices or entities arranged in one of the lighting devices 212, 222, 232 of the corresponding group 21, 22, 23, which they are controlling, i.e. as a part of the lighting devices 212, 222, 232.

Figure 4:
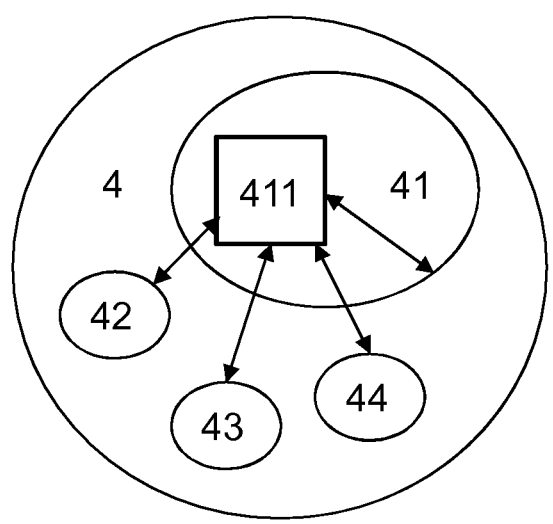
FIG. 4 illustrates an implementation of a group controller according to an embodiment of the present invention.

FIG. 4 illustrates an implementation of a group controller 411 according to an embodiment of the present invention, which is configured to control lighting devices 41, 42, 43, 44 of group 4 and which is arranged in the lighting device 41. In general, the configuration of the group controller 411 may correspond to the configuration of group controllers 211, 221, 231 of FIG. 2 or to the configuration of group controllers 31, 32, 33 of FIG. 3. Arrows in FIG. 4 illustrate that the group controller 411 is configured to communicate with lighting devices 41 to 44 of its group 4 for controlling purposes.

In following, performing load or energy consumption control according to several embodiments of the present invention will be explained in following by taking reference to the above-discussed FIGS. 1 to 4.

Each k-th group 21, 22, 23, 4 (with 1≤k≤K and K being the total number of groups 21, 22, 23, 4 in the lighting system) of the system may be configured to serve various purposes and/or situations, e.g., reading task, computer task, meeting task, unoccupied, etc., resulting in various local control modes corresponding to the purposes/situations. For each group 21, 22, 23, 4 of the system, at least one control mode may be specified, in which conditions and/or information for operating the corresponding group 21, 22, 23, 4 in the system are defined. A control mode may be defined with regard to a predetermined time period so that the operation of the corresponding group will be switched to the control mode during the predetermined time period. Further, a control mode may be provided for a certain situation so that, if the certain situation occurs, operation of the group will be switched to the control mode provided for the certain situation. If only one control mode is provided for a group 21, 22, 23, 4, the mode may specify the operation of the group 21, 22, 23, 4 in general, i.e., without referring to a predetermined time period or a certain situation. A control mode of a k-th group 21, 22, 23, 4 may comprise at least one of the following: maximum illumination level of the k-th group 21, 22, 23, 4; minimum illumination level of the k-th group 21, 22, 23, 4; maximum power consumption level $P_k^{max}$ of the k-th group 21, 22, 23, 4; minimum power consumption level $P_k^{min}$ of the k-th group 21, 22, 23, 4. Further, a control mode may comprise a specification of a nominal illumination level and/or a nominal power consumption $P_k^{non}$ for a corresponding k-th group 21, 22, 23, 4. A nominal illumination level defines a typical or default illumination level used (at first) when the corresponding k-th group 21, 22, 23, 4 is operated in the control mode. A nominal power consumption defines a typical or default power consumption amount or value used when the corresponding k-th group 21, 22, 23, 4 is operated in the control mode. The value of Pr may be set to the same value as $P_k^{max}$, wherein the setting is optional and not mandatory. If only $P_k^{min}$ and $P_k^{non}$ are specified in a control mode, it could be assumed that the nominal power is set to $P_k^{max}$.

The corresponding specifications of control modes of groups 21, 22, 23, 4 may be provided to the system, for example, by a user or by a facility manager. The specifications or definitions of control modes may be different among the groups 21, 22, 23, 4. For example, if at least two groups 21, 22, 23, 4 have a corresponding mode directed to the same period of time or to a certain situation like an occupied mode for an office room, for example, the corresponding mode (e.g., occupied mode) of one group 21, 22, 23, 4 may have a specification (i.e. information and/or conditions on operation of the one group 21, 22, 23, 4), which is different from specification of a corresponding mode (e.g., occupied mode) of another group 21, 22, 23, 4. A specification of a control mode of a group 21, 22, 23, 4 may be inputted into or provided to the corresponding group controller 211, 221, 231, 31, 32, 33, 411. Further, a corresponding specification of a control mode of a group 21, 22, 23, 4 may be stored by the corresponding group controller 211, 221, 231, 31, 32, 33, 411.

In a centralized architecture, as exemplary shown in FIG. 2, a specification of a control mode of a group 21, 22, 23 can also be communicated (e.g. from the corresponding group controller 211, 221, 231, 411) to the central controller 20, which also may store the specification of the control mode. Alternatively, a specification of a control mode of a group 21, 22, 23 may be inputted into or provided to the central controller 20, which may store the specification of the control mode and/or communicate the specification of the control mode to the corresponding group controller 211, 221, 231, 411.

The specifications of control modes may be defined, for example, during the commissioning process and may be changed when deemed necessary (e.g., to tailor to individual preference).

The power consumption control may be performed in response to determining, that a power consumption change has to be performed in the system, by increasing (i.e., restoring) or reducing (i.e., shedding) the power consumption in the system. The power consumption control may be performed with regard to a point of time like current (i.e., present), arbitrary or specified point of time, for example. In following, this point of time is referred to as time instant t. When the power consumption control is performed with regard to a time instant t, for each group 21, 22, 23, 4, power consumption of which is controlled, it is determined, in which control mode the corresponding group 21, 22, 23, 4 is operated at the time instant t. Then, the specification of the corresponding determined control mode of time instant t (particularly, the information comprised in the specification) is used for controlling the power consumption of the corresponding group 21, 22, 23, 4.

In general, for each time instant t and for a k-th group 21, 22, 23, 4, the following values may be defined: $P_k^{min}(t)$ as minimum power consumption at time t for the k-th group 21, 22, 23, 4; $P_k^{max}(t)$ as maximum power consumption at time t for a k-th group 21, 22, 23, 4; $P_k(t)$ as current (i.e. actual at the current time present) power consumption at time t in k-th group 21, 22, 23, 4; $P_k^{tgt}(t)$ as target power consumption at time t for a k-th group 21, 22, 23, 4. Further, a target group power reduction or increase value $\Delta P_k^{tgt}(t)$ can be specified as $\Delta P_k^{tgt}(t)=P_k(t)-P_k^{tgt}(t)$, wherein a negative value of $\Delta P_k^{tgt}(t)$ indicates that a power increase should be performed at time t for a k-th group 21, 22, 23, 4 and a positive value of $\Delta P_k^{tgt}(t)$ indicates that a power reduction should be performed at time t for k-th group 21, 22, 23, 4.

Further, the following values may be specified with regard to the lighting system, wherein also said values may be determined or given for a time instant t: $P_{non}(t)$ as current power consumption of the uncontrollable loads of the uncontrollable lighting devices, i.e. of lighting devices, power consumption of which can not be controlled in the system;

$$P_{sys}(t) = \sum_{k=1}^{K} P_k(t) + P_{non}(t)$$

as a current system power consumption at the time instance t being a sum of current power consumptions of each of groups 21, 22, 23, 4 and of current power consumptions of the uncontrollable lighting devices; $P_{sys}^{tgt}(t)$ as target system power consumption (amount or value), which should or has to be achieved in the system at the time instance t. Further, a target system power reduction or increase value $\Delta P_{sys}^{tgt}(t)$ can be specified as $\Delta P_{sys}^{tgt}(t)=(1+\alpha) \cdot (P_{sys}(t)-P_{sys}^{tgt}(t))$, wherein a negative value of $\Delta P_{sys}^{tgt}(t)$ indicates that a power increase should be performed in the system and a positive value of $\Delta P_{sys}^{tgt}(t)$ indicates that a power reduction should be performed in the system. The parameter $\alpha$ is set to ensure that after performing power control in the system, i.e. after reducing or increasing the power consumption in the system, there are still some margins left for sudden change of power consumption, e.g. due to the change in occupancy pattern (a person entering an office room previously not lit). Thus, with the parameter $\alpha$ it is ensured that $\Delta P_{sys}^{tgt} \leq (P_{sys}-\Delta P_{sys}^{tgt})$, wherein, if power consumption reduction is to be performed, $0 \leq \alpha \leq 1$ and wherein, if power consumption increase is to be performed, $-1 \leq \alpha \leq 0$. In the present application, $\Delta P_{sys}^{tgt}(t)$ is referred to also as target system power change value or amount. $\Delta P_{sys}^{tgt}(t)$ may be received by the controlling device, for example, from an external system or from a component or device, which is configured to determine that a power consumption change is required in the system.

The above discussed parameters may be used also without explicitly referring to a time instance t.

Moreover, a load shedding flexibility value $LSF_k$ is defined as $LSF_k=P_k-P_k^{min}$, i.e. as value indicating, how much the power consumption could be reduced for a k-th group 21, 22, 23, 4 without going below the minimum power consumption $P_k^{min}$ allowed for the k-th group 21, 22, 23, 4, i.e. by staying above the minimum power consumption $P_k^{min}$ allowed for the k-th group 21, 22, 23, 4. A load restoration flexibility value $LRF_k$ is defined as $LRF_k=P_k^{max}-P_k$, i.e. as value indicating, how much the power consumption could be increased for a k-th group 21, 22, 23, 4 without going above the maximum power consumption $P_k^{max}$ allowed for the k-th group, i.e. by staying below the maximum power consumption $P_k^{max}$ allowed for the k-th group 21, 22, 23, 4. The load shedding flexibility $LSF_k$ is, thus, the maximum amount of power that can be shed in the k-th group 21, 22, 23, 4 without violating its minimum power requirement. Similarly, the load restoration flexibility $LRF_k$ is the maximum amount of power that can be given to k-th group 21, 22, 23, 4 without crossing its maximum power level.

Figure 5:
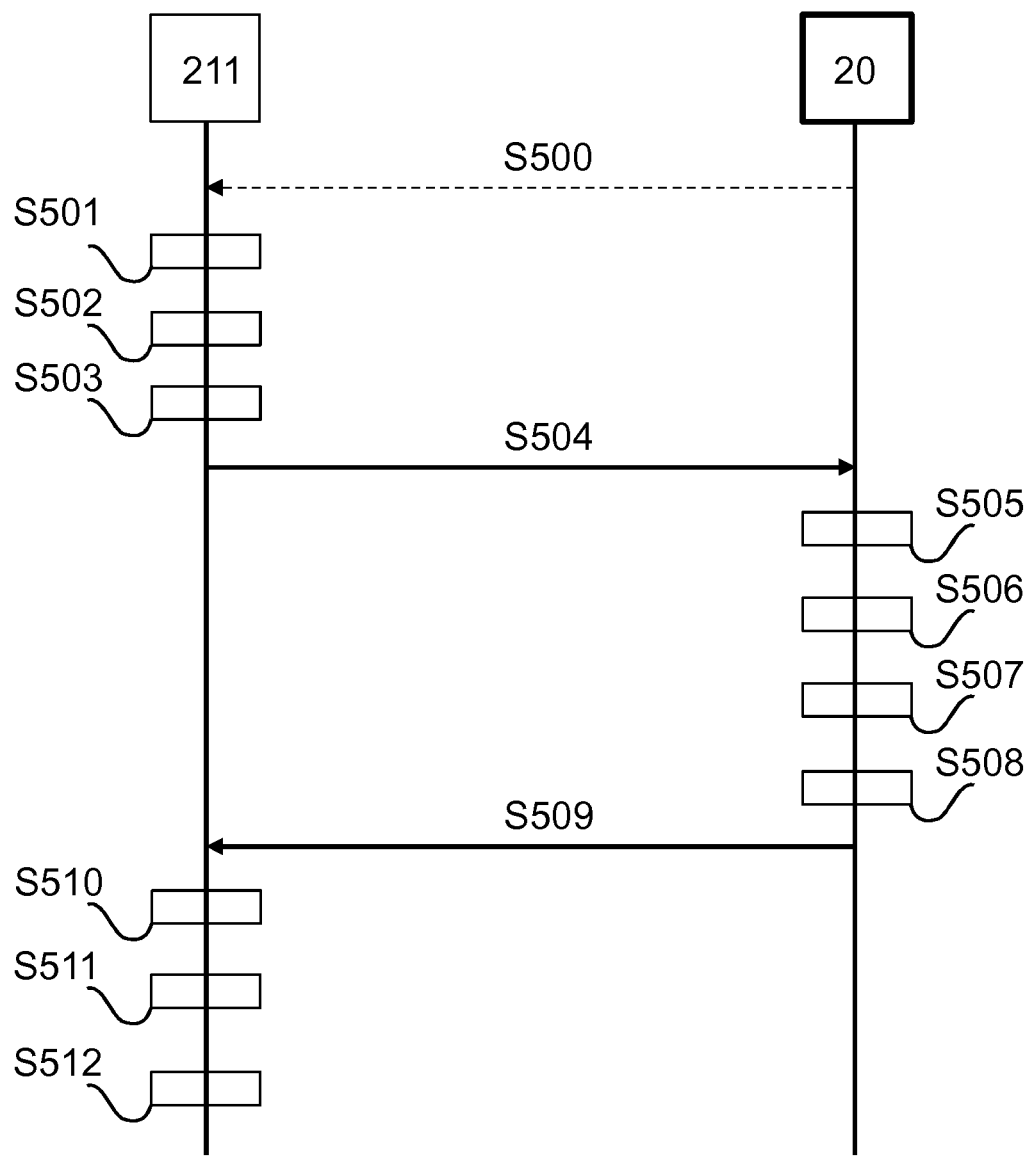
FIG. 5 illustrates steps of controlling power consumption in a lighting system performed according to an embodiment of the present invention.

FIG. 5 illustrates steps of controlling power consumption in a lighting system performed according to an embodiment of the present invention. Particularly, the present embodiment of FIG. 5 is provided with regard to the centralized architecture, as exemplary shown in FIG. 2. The steps of FIG. 5 can be seen as steps performed with regard to a time instance t. For sake of clarity and conciseness, in FIG. 5, the steps are provided with regard to the central controller 20 and the group controller 211 as a representative of all group controllers 211, 221, 231, 411 of the lighting system. However, said steps are provided with regard to each of the group controllers 211, 221, 231, 411 of the lighting system. I.e., the communications steps and the steps performed at the group controller 211 are performed at and with regard to each of the group controllers 211, 221, 231, 411 of the system.

In line with the present embodiment, the central controller S500 may send in step S500 to group controller 211 (and also to all another group controllers 221, 231, 411) a request for transmitting information allowing the central controller 20 to determine the power consumption control value of group 21 (and also of all another groups 22, 23, 4). According to the present embodiment, in response to the request, the group controller 211 (and also to all another group controllers 221, 231, 411), determines the control mode used at time instance t for operating the group 21 and determines a minimum power consumption $P_k^{min}(t)$ and/or a maximum power consumption $P_k^{min}(t)$ of its group 21 by use of the maximum and/or minimum illumination levels and/or from the maximum and/or minimum power consumption levels specified in the determined control mode and/or by use of further factors or information, which are specified in the determined control mode of the group 21 and/or are determined with regard to the group 21, for example, by a sensor unit 24. Such further factors of information may be the daylight level, for example, since $P_k^{min}(t)$ and $P_k^{max}(t)$ may be specified for a certain daylight level. If the daylight level changes with respect to the daylight level specified in the determined control mode of the group 21, a correction factor is then added to $P_k^{min}(t)$ and $P_k^{max}(t)$.

It has to be noted that the step S501 may be performed also autonomously by the group controller 211 (and also by each of another controllers 221, 231, 411 of the system), i.e. also if the group controller 211 does not receive a request as outlined with regard to step S300.

In step S502, the group controller 211 determines the current power consumption $P_k(t)$ in the group 21. Thereto, the group controller 211 may use any appropriate known methodology for calculating the current power consumption $P_k(t)$ or may read or receive it from a correspondingly configured sensor 24 for measuring the current power consumption in the group 21. Step S502 may be done after step S501, or before step S501.

In line with the present embodiment, in step S503, the group controller 211 determines information related to the load shedding flexibility value $LSF_k$ and/or the load restoration flexibility value $LRF_k$. To this, the group controller 211 may, for example, derive or calculate the load shedding flexibility value $LSF_k$ as $LSF_k=P_k(t)-P_k^{min}(t)$ and/or the load restoration flexibility value $LRF_k$ as $LRF_k=P_k^{max}(t)-P_k(t)$, both as the information being related to $LSF_k$ and $LRF_k$, or determine or select data relevant for calculating or deriving $LSF_k$ and/or $LRF_k$ as the information being related to $LSF_k$ and/or $LRF_k$, wherein the data may comprise, for example, at least one of the following: $P_k(t)$, $P_k^{min}(t)$, $P_k^{max}(t)$. When the specifications of the maximum and minimum illumination/power consumption levels for each group 21, 22, 23, 4 are also stored in the central controller 20, the relevant data comprise, for example, at least one of the following: the corresponding control mode, $P_k(t)$, or information from which $P_k(t)$ may be derived, for example, dimming level, and the daylight correction factor. According to the present embodiment, in step S504, the group controller 211 transmits the derived information being related to the load shedding flexibility value $LSF_k$ and/or the load restoration flexibility value $LRF_k$ to the central controller 20. The step S504 can be performed at any time instance t or if at least one of the values: $LSF_k$ and $LRF_k$, has changed at the current time instance t (i.e., at least one of the values: $LSF_k$ and $LRF_k$, at the current time instance t is not equal values $LSF_k$ and/or $LRF_k$ determined at a previous or earlier time instance).

As mentioned above, according to the present embodiment, steps S501 to S504 may be performed by every group 21, 22, 23, 4 of the K groups 21, 22, 23, 4. Further, said steps S501 to S504 may be performed in response to a request of the central controller 20 transmitted (e.g., broadcasted) S500 from the central controller 20 to each of K groups 21, 22, 23,

4 for requesting transmitting information being related to the load shedding flexibility value $LSF_k$ and/or the load restoration flexibility value $LRF_k$ or may be performed autonomously by the group controllers 211, 221, 231, 411.

The central controller 20 receives information being related to the load shedding flexibility value $LSF_k$ and/or the load restoration flexibility value $LRF_k$ from all K groups 21, 22, 23, 4 or from all group controllers 211, 222, 231, 411, respectively, as indicated by step S504 with regard to the group 21 and the group controller 211. If the values $LSF_k$, $LRF_k$ are not provided directly with said information, the central controller 20 determines said values $LSF_k$, $LRF_k$ by use of said received information (e.g., by calculating $LSF_k$ as $LSF_k=P_k(t)-P_k^{min}(t)$ and $LRF_k$ as $LRF_k=P_k^{max}(t)-P_k(t)$ if said information comprises $P_k(t)$ $P_k^{min}(t)$ $P_k^{max}(t)$). Then, if required, the central controller 20 stores $LSF_k$ and/or $LRF_k$ values of all K groups. The step of receiving and, if required, determining (and, if necessary, of storing) the $LSF_k$ and/or $LRF_k$ values of the group 21 from the group controller 211 are shown in FIG. 3 in summary by step S505.

According to the present embodiment, in step S506, the central controller 20 determines the current power consumption $P_{sys}$ of the system. Thereto, the central controller 20 may use any appropriate known methodology for determining current power consumption. According to an embodiment, the central controller 20 may be adapted to receive $P_{sys}$ from a power consumption-measuring sensor 24.

In step S507, according to the present embodiment, the central controller 20 determines the target system power consumption $P_{sys}^{tgt}$, which may be, for example, pre-specified (e.g., by the facility manager) and stored in the central controller 20 or may be received from an external system (e.g., from utility of Demand Response (DR) aggregator). Hence, the value of $P_{sys}^{tgt}$ may be a time-varying value. Here, it has to be noted that steps S505, S506 and S507 can be performed in an arbitrary order and that the present embodiment is not limited by the order shown in FIG. 5.

Figure 6:
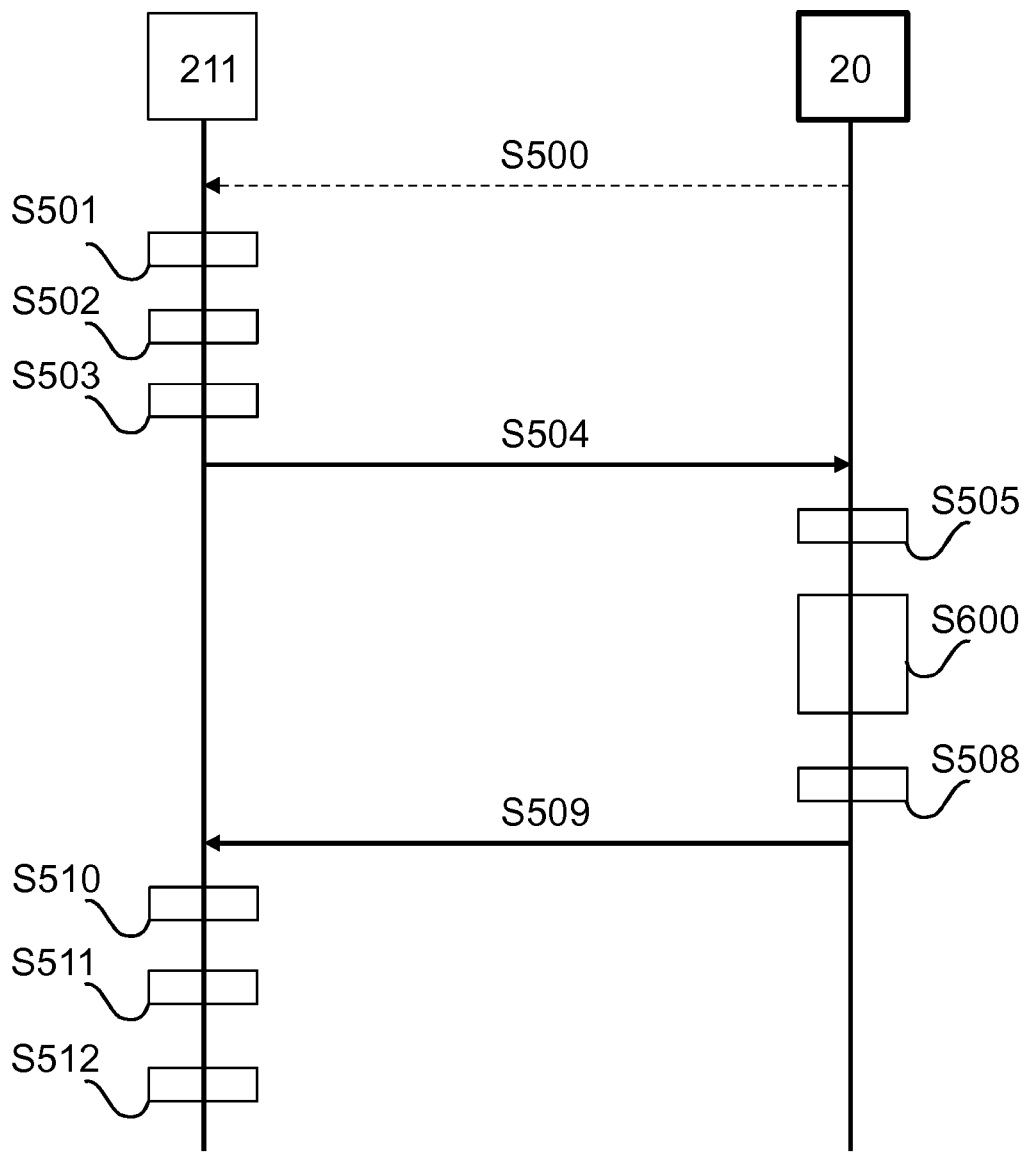
FIG. 6 illustrates steps of controlling power consumption in a lighting system performed according to an embodiment of the present invention.

Further, according to another embodiment of the present invention, as shown exemplary in FIG. 6, instead of performing steps S506 and S507, the central controller 20 may receive in a step S600 a target system power change value $\Delta P_{sys}^{tgt}(t)$, e.g., from the facility manager or from an external system (e.g., from utility of Demand Response (DR) aggregator).

Then, in step S508, the central controller 20 determines a power consumption control value for controlling power consumption of devices 212 of the group 21. Particularly, for each of the K groups 21, 22, 23, 4, a corresponding power consumption control value may be determined.

Figure 7:
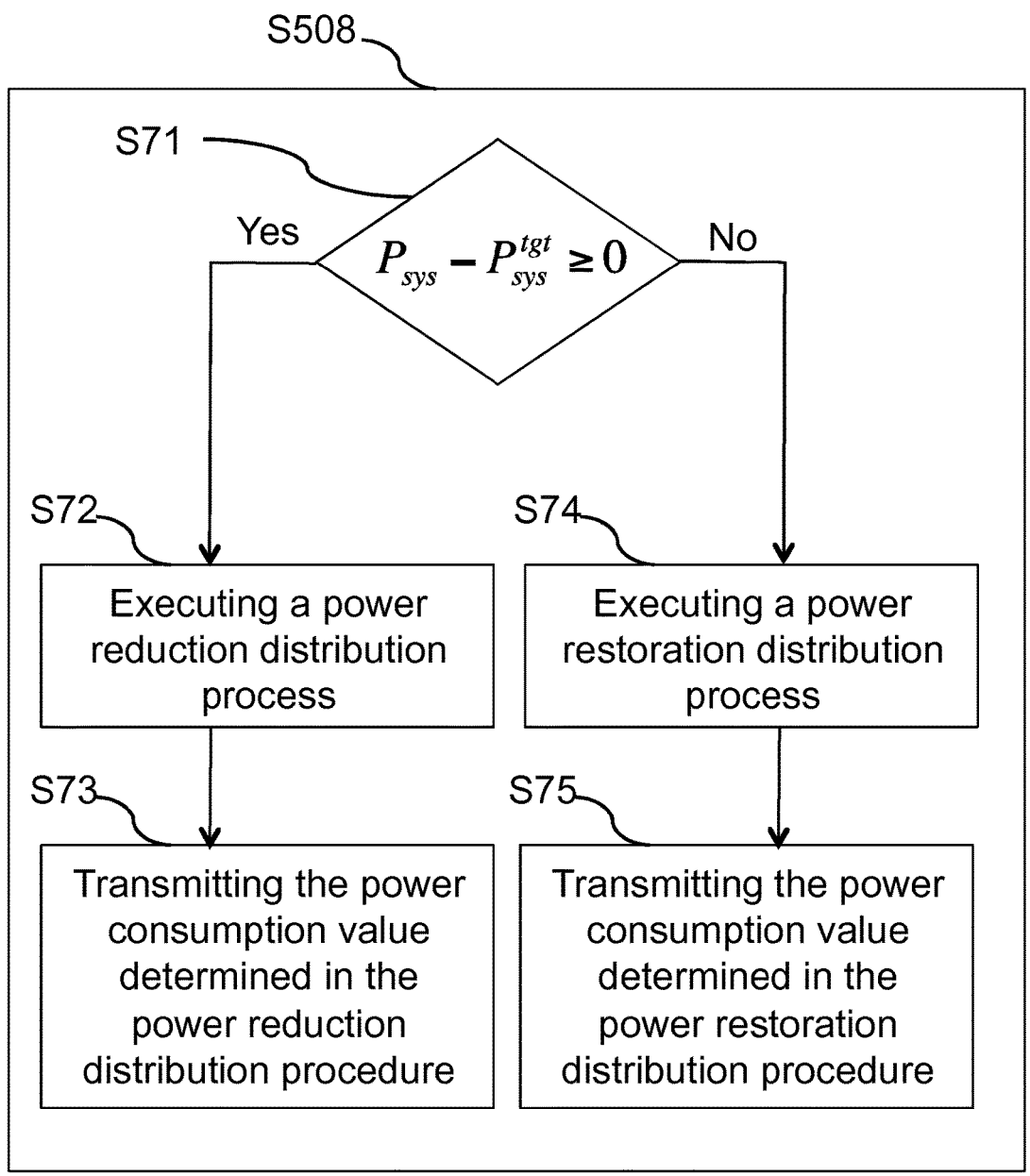
FIG. 7 illustrates steps of determining a power consumption control value for a group according to an embodiment of the present invention.

FIG. 7 illustrates steps of determining S508 the power consumption control value for the group 21 according to an embodiment of the present invention. According to the present embodiment, at first, in step S71, the central controller 20 may determine or compute the target system power change value $\Delta P_{sys}^{tgt}$.

In case of embodiment of FIG. 6, $\Delta P_{sys}^{tgt}$ is received in step S600, thus with regard to the embodiment of FIG. 6, the determining S71 comprises obtaining the received $\Delta P_{sys}^{tgt}$, i.e., the received $\Delta P_{sys}^{tgt}$ represents the determined $\Delta P_{sys}^{tgt}$.

In case of embodiment of FIG. 5, in step S71, the central controller 20 may determine or compute the target system power change value $\Delta P_{sys}^{tgt}$ as $\Delta P_{sys}^{tgt}=(1+\alpha)\cdot(P_{sys}-P_{sys}^{tgt})$ by use of the current power consumption $P_{sys}$ of the system determined in step S506 and by use of the target system power consumption $P_{sys}^{tgt}$ determined in step S507.

Then, according to the present embodiment, in step S71, the central controller 20 performs a comparison step. In a first sub-comparison, the central controller determines whether $\Delta P_{sys}^{tgt} > \epsilon_{shed}$ or $P_{sys}-P_{sys}^{tgt} > \epsilon_{shed}$, respectively, wherein $\epsilon_{shed} \geq 0$ is a parameter (e.g. set by the facility manager) specifying the minimum value of target system power change value $\Delta P_{sys}^{tgt}$, upon which any power reduction (or shedding) distribution will be executed.

If the comparison is true (see case 'Yes' in FIG. 7), i.e. if $\Delta P_{sys}^{tgt} > \epsilon_{shed}$ or if $P_{sys}-P_{sys}^{tgt} > \epsilon_{shed}$, respectively, the central controller 20 runs a power reduction distribution algorithm in step S72 to compute for each of K groups 21, 22, 23, 4 a corresponding power consumption control value based on the $LSF_k$ values of the corresponding K groups 21, 22, 23, 4. To this, the central controller 20 uses the corresponding $LSF_k$ values received from the corresponding group controllers 211, 221, 231, 411 and, if necessary, stored in the central controller 20, and the target system power change value $\Delta P_{sys}^{tgt}$. In step S73, the central controller 20 transmits the corresponding power consumption control values to the corresponding group controllers 211, 221, 231, 411. The power consumption control value of a k-th group 21, 22, 23, 4 may be the above described $\Delta P_k^{tgt}(t)$. Alternatively, the central controller 20 may express $\Delta P_k^{tgt}(t)=x_k\cdot LSF_k$ and transmit in step S73 $x_k$ instead of the $\Delta P_k^{tgt}(t)$ as the power consumption control value of k-th group 21, 22, 23, 4. Alternatively, the power consumption control value, as sent in step S73, comprises an operating parameter indicating how each of the power consuming devices 212, 222, 232, 41 to 44 in the group 21, 22, 23, 4 has to be operated. For example, in lighting systems with step-wise dimmable ballasts, the operating parameter can be the dimming level that each of the ballast in the group 21, 22, 23, 4 need to apply. As another example, in heating systems, the operating parameter can be the new target temperature the heating device should aim for. As a final example, for a step-wise controlled fan, the operating parameter can indicate the speed with which the fan will operate.

According to the present embodiment, in a second sub-comparison, the central controller 20 determines whether $\Delta P_{sys}^{tgt} < \epsilon_{restore}$ or whether $P_{sys}-P_{sys}^{tgt} < \epsilon_{restore}$, respectively. If the comparison is true (see case 'No' in FIG. 7), the central controller 20 runs a power restoration distribution algorithm in step S74 to compute for each of all K groups 21, 22, 23, 4 a corresponding power consumption control value based on the $LRF_k$ values of the corresponding K groups 21, 22, 23, $\epsilon_{restore} \leq 0$ is a parameter (e.g. set by the facility manager) specifying the maximum value of target system power change value $\Delta P_{sys}^{tgt}$, upon which any power restoration (or increase) distribution will be executed. To this, the central controller 20 uses the corresponding $LRF_k$ values received from the corresponding group controllers 211, 221, 231, 411 and, if necessary, stored in the central controller 20. In step S73, the central controller 20 transmits the corresponding power consumption control values to the corresponding group controllers 211, 221, 231, 411. The power consumption control value of a k-th group 21, 22, 23, 4 may be the above described $\Delta P_k^{tgt}(t)$. Alternatively, the central controller 20 may express $\Delta P_k^{tgt}(t)=x_k\cdot LRF_k$ and transmit $x_k$ instead of the $\Delta P_k^{tgt}(t)$ as the power consumption control value of the k-th group 21, 22, 23, 4. Here, it has to be noted that the criterion to start a load restoration or power consumption increase procedure may be made stricter, e.g., when $\Delta P_{sys}^{tgt} < \epsilon_{restore}$ or $P_{sys}-P_{sys}^{tgt} < \epsilon_{restore}$, respectively, for a certain duration, e.g. 30 minutes.

If $x_k$ is used instead of the $\Delta P_k^{tgt}(t)$ as the power consumption control value of a k-th group 21, 22, 23, 4, then $x_k$ is a value satisfying $-1 \leq x_k \leq 1$, wherein $x_k=1$ indicates that a maximum power reduction should be performed in the k-th group and $x_k=-1$ indicates that a maximum power restoration should be performed in the k-th group. In general, positive values $x_k$ indicate a degree of power consumption reduction or shedding to be performed in the corresponding group k and negative values $x_k$ indicate a degree of power consumption restoration or increase to be performed in the corresponding group k. According to a further embodiment, a broadcast message comprising $x=x_k=1$ indicates that all groups 21, 22, 23, 4 must operate at the lowest power consumption level, and a broadcast message comprising $x=x_k=-1$ indicates that all groups 21, 22, 23, 4 may restore the power to its maximum, e.g. signaling an end of power reduction event. In this further embodiment, a corresponding broadcast message can be broadcasted or transmitted (in step S73 if x=1 and in step S75 if x=-1) to all groups 21, 22, 23, 4. Furthermore, according to another embodiment, a message comprising a certain determined value $x_k=x$, $-1 \leq x \leq 1$, can be broadcasted or transmitted (in step S73 if x is positive, in step S75 if x is negative) for indicating the same degree of power consumption change in all groups 21, 22, 23, 4.

In FIG. 5, with step S509, the transmission of the correspondingly determined power consumption control value of k-th group 21 from the central controller 20 to the group controller 211 and accordingly the reception of the power consumption control value of the k-th group 21 by the group controller 211 are indicated. Particularly, the central controller 20 may compute or determine S508 for each of the K groups 21, 22, 23, 4 the corresponding power consumption control value and transmit in step S509 to each of the K groups 21, 22, 23, 4 the corresponding determined or computed power consumption control value.

In step S510, if $x_k$ has been received as the power consumption control value, the group controller 211 first computes $\Delta P_k^{tgt}(t)$ by use of the following equation:

$$\Delta P_k^{tgt} = \begin{cases} x_k \cdot LSF_k, & x_k \geq 0 \\ x_k \cdot LRF_k, & x_k < 0 \end{cases}.$$

By use of $\Delta P_k^{tgt}(t)$, being received in step S509 or computed from $x_k$, a new/current target power consumption value $P_k^{tgt}(t)$ of the group 21 is computed in step S510 by use of the current power consumption value $P_k(t)$ of the group 21 and by use of $\Delta_k^{tgt}(t)$: $P_k^{tgt}(t) = P_k - \Delta P_k^{tgt}(t)$. Then, in step S511, target/new power consumption levels for the lighting devices 212 of the group 21 are derived by use of the computed $P_k^{tgt}(t)$ such that the target/new total power consumption of said lighting devices 212 is equal or less than $P_k^{tgt}$ (0, i.e. the target/new power consumption of said lighting devices 212 is not larger than and approximately equal to $P_k^{tgt}(t)$. After deriving S511 the power consumption of the lighting devices 212, in step S312, illumination levels of the lighting devices 212 are adjusted by adjusting them in view of the previously derived power consumption levels of the lighting devices 212. I.e., the illumination levels are determined by use of the new power consumption levels.

According to the present embodiment, for each further time instance t', t'>t, the group controller 211 (and each another group controller 221, 231, 411) is configured to maintain the actual power consumption $P_k(t')$ at the further time instance t' smaller or equal the target power consumption $P_k^{tgt}(t)$ for the group 21 (for the corresponding another group 22, 23, 4), which has been determined at the time instance t (due to the changed values $LSF_k$ and $LRF_k$ at the time instance t). Thus, the group controller 211 (and each another group controller 221, 231, 411) is configured to maintain $P_k(t') \leq P_k^{tgt}(t)$, unless certain new situations, changes or events occur, for example:

There is another power change command (either reduction or restoration) from the central controller 20;

The daylight level has decreased such that the illumination level is less than the minimum illumination level. When this happens, the group controller 211 (and each another group controller 221, 231, 411) may adjust the illumination level such that the overall illumination level is returned to the level prior to the decrease of the daylight. Alternatively, the illumination level variation due to daylight decrease may be limited to a certain percentage (e.g. 20%) of the target illumination level as derived from $P_k^{tgt}(t)$, provided that the lowest illumination level due to the variation is still higher than the minimum illumination level;

The local control mode changes and the new local control mode require more power consumption, e.g. the local control mode changes from unoccupied to occupied. The group controller 211 (and each another group controller 221, 231, 411) will adjust the illumination levels according to the levels specified for the new local control mode.

The steps of FIGS. 5 and 6 have been described exemplary with regard to the group 21 and its controller 211 and lighting devices 212. However, it has to be noted, that may be performed with regard to any group 21, 22, 23, 4 and with regard to any group controller 211, 221, 231, 411 and to any energy consuming device 212, 222, 232, 41 to 44 of the group 21, 22, 23, 4.

In following, more detailed description of steps of power reduction/restoration distribution processes, mentioned with regard to step S508 of FIGS. 5 and 6 and with regard to steps S72, S74 of FIG. 7, will be provided. Said power reduction/restoration distribution processes may be performed in different ways. The descriptions provided below are to be seen as being exemplary. In line with embodiments of the present invention, also further appropriate and known power reduction/restoration distribution processes may be used correspondingly.

As mentioned above, according to the embodiments of the present invention, the power reduction/restoration distribution processes use $LSF_k$ and/or $LRF_k$ values as inputs and are configured to ensure that the total power consumption of the system does not exceed the system target power consumption, i.e. said processes are configured to ensure that:

$$\sum_{k=1}^{K} P_k^{tgt} + P_{non} \leq P_{sys}^{tgt}.$$

According to a first embodiment of the present invention, by the power reduction/restoration distribution process, the central controller 20 computes the power consumption value $x_k = x$ as follows:

$$x = \begin{cases} \Delta P_{sys}^{tgt} \bigg/ \sum_{k=1}^{K} LSF_k & \text{in case of load or power consumption reduction(if } e.g. \ P_{sys} - P_{sys}^{tgt} > \varepsilon_{shed}) \\ \Delta P_{sys}^{tgt} \bigg/ \sum_{k=1}^{K} LRF_k & \text{in case of load or power consumption increase(if } e.g. \ P_{sys} - P_{sys}^{tgt} < \varepsilon_{restore}) \end{cases}$$

The power reduction/restoration distribution process of the first embodiment of the present invention essentially distributes the power reduction proportional to $LSF_k/LRF_k$. Further, since $x_k = x$ for every group k ($1 \leq k \leq K$), $x_k$ also can be transmitted in steps S509, S73, S75 more economically by use of a broadcast message According to a second embodiment of the present invention, for implementing the power reduction/restoration distribution process the water-pouring process, as described, for example, in T. M. Cover and J. A. Thomas, "Elements of Information Theory", 1st Edition, New York, Wiley-Interscience, 1991, can be used to distribute the load or power consumption reduction/restoration across the K groups based on the load or power consumption shedding/restoration flexibility, i.e. based on the values $LSF_k/LRF_k$.

The power reduction/restoration distribution process of the second embodiment essentially distributes the power reduction/restoration so that the differences between the $LSF_k$ or $LRF_k$ values after the distribution are minimized.

According to the second embodiment, when the power reduction distribution process is performed S72, i.e. when $\Delta P_{sys}^{tgt} > \varepsilon_{shed}$ or $P_{sys} - P_{sys}^{tgt} > \varepsilon_{shed}$ in a first step, the group indices are re-numbered or re-ordered by comparing the corresponding values load shedding factor $LSF_k$, wherein to a group having a larger load shedding factor a smaller index is assigned than to a group having a smaller load shedding factor. Thus, the group indices are re-numbered or re-ordered such that: $LSF_1 \geq LSF_2 \geq \ldots \geq LSF_K$. Said re-numbering or re-ordering can be implemented in a fast way, wherein the time complexity can be, for example, K log K.

In a further step, according to the second embodiment, the following steps, known as water-pouring process in the area of communications technique, can be implemented:

```
Δ := P_sys - P_sys^tgt;
m := 1;
level := LSF_1;
while Δ ≠ 0;
    do begin j := min( Δ /m, level - LSF_{m+1});
        level := level - j;
        Δ := Δ - mj;
        m := m + 1;
    end;
    for k := 1 to m - 1 do ΔP_k^tgt (t) := LSF_k - level;
    for k := m to K do ΔP_k^tgt (t) := 0;
```

In this way, when performing the power reduction distribution process S72 according to the second embodiment by implementing the water-pouring process, an optimum power consumption or load reduction is performed, according to which the larger the load shedding flexibility $LSF_k$ of a group k is, the more the power consumption or load reduction/shedding is performed in said group k.

Further, when the power restoration distribution process is performed S74 according to the second embodiment, i.e. when $\Delta P_{sys}^{tgt} < \varepsilon_{restore}$ or $P_{sys} - P_{sys}^{tgt} < \varepsilon_{restore}$ in a first step, the group indices are re-numbered or re-ordered by comparing the corresponding values of the load restoration factors $LRF_k$, wherein to a group having a larger load restoration factor a smaller index is assigned than to a group having a smaller load restoration factor. Thus, the group indices are re-numbered or re-ordered such that: $LRF_1 \geq LRF_2 \geq \ldots \geq LRF_K$. Also here, said re-numbering or re-ordering can be implemented in a fast way, wherein the time complexity can be, for example, K log K.

In a further step, according to the second embodiment, the following steps, known as water-pouring process in the area of communications technique, can be implemented:

```
Δ := P_sys^tgt - P_sys;
m := 1;
level := LRF_1;
while Δ ≠ 0;
    do begin j := min( Δ /m, level - LRF_{m+1});
        level := level - j;
        Δ := Δ - mj;
        m := m + 1;
    end;
    for k := 1 to m - 1 do ΔP_k^tgt (t) := LRF_k - level;
    for k := m to K do ΔP_k^tgt (t) := 0;
```

In this way, when performing the power restoration distribution process S74 according to the second embodiment by implementing the water-pouring process, an optimum power consumption or load increasing/restoration is performed, according to which the larger the load restoration flexibility $LRF_k$ of a group k is, the more the power consumption or load increasing/restoration is performed in said group k.

Thus, according to the second embodiment, with the above outlined steps, for the case of load or power consumption shedding/reduction, groups with large $LSF_k$ values will suffer a larger power reduction or shedding than with the approach of the first embodiment, while groups with small $LSF_k$ values will suffer a smaller power reduction or shedding. In fact, groups with small $LSF_k$ values (and having illumination and power consumption levels close to minimal levels) may not have a power reduction at all, what may result in no changes in illumination and power consumption levels. The same applies also to the load or power consumption restoration/increasing. Groups with large $LRF_k$ values will suffer a larger power increase or restoration than with the approach of the first embodiment, while groups with small $LRF_k$ values will suffer a smaller power increase or restoration. In fact, groups with small $LRF_k$ values (and having illumination and power consumption levels close to maximal levels) may not have a power increase at all, what may result in no changes in illumination and power consumption levels.

According to a third embodiment of the present invention, the power reduction/restoration distribution process is such that as few groups as possible experience a load or power change and, thus, an illumination level change.

According to the third embodiment, when the power reduction distribution process is performed S72, i.e. when $\Delta P_{sys}^{tgt} > \varepsilon_{shed}$ or $P_{sys} - P_{sys}^{tgt} > \varepsilon_{shed}$, in first step, the group indices are re-numbered or re-ordered by comparing the corresponding values of the load shedding factors $LSF_k$, wherein to the group having a larger load shedding factor is assigned a smaller index than the group having a smaller $LSF_k$ value. Thus, the group indices are re-numbered or re-ordered such that: $LSF_1 \geq LSF_2 \geq \ldots \geq LSF_K$. Said re-numbering or re-ordering can be implemented in a fast way, wherein the time complexity can be, for example, K log K. In a next step, the smallest value m is determined such that $$\sum_{k=1}^{m} LSF_k \geq P_{sys} - P_{sys}^{tgt}.$$

Finally, $\Delta P_k^{tgt}(t)$ for $k=1, 2, \ldots, m$ is determined such that $0 \leq \Delta P_k^{tgt}(t) \leq LSF_k$ and $$\sum_{k=1}^{m} \Delta P_k^{tgt}(t) = \Delta P_{sys}^{tgt}.$$

According to the third embodiment, when the power restoration distribution process is performed S74 similarly. To this, the above described steps of the power reduction distribution process of the third embodiment are performed by correspondingly replacing the $LSF_k$ values by the $LRF_k$ values and by finding the smallest value m such that $$\sum_{k=1}^{m} LRF_k \geq P_{sys}^{tgt} - P_{sys}.$$

According to a fourth embodiment of the present invention, implementing the power reduction/restoration distribution process is performed such that the target power reductions or increases are made as equal as possible. To this, it is taken into account that each group target power is between the minimum and maximum power consumption for that group.

According to the fourth embodiment, when the power reduction distribution process S72 is performed, a value m represents a number of groups with non-zero load shedding flexibility $LSF_k$. For each group k, a first contribution to the load shedding equals to the minimum of $(P_{sys}-P_{sys}^{tgt})/m$ and $LSF_k$ is given. The value of the amount of power to be shed is reduced with the same amount. If all groups have had their turn, m is re-computed and the same load or power consumption reduction scheme is applied. This is continued until $\Delta P_{sys}^{tgt}=0$.

The steps for the power reduction distribution process S72 according to the fourth embodiment can be implemented as follows:

```
Δ := P_sys - P_sys^tgt;
m := 0;
for k := 1 to K
do begin ps[k] := LSF_k; if LSF_k ≠ 0 then m := m + 1 end;
while Δ ≠ 0
do begin j := 0; red := Δ/m;
    for k := 1 to K
    do if ps[k] > red
        then begin j := j + 1; ps[k] := ps[k] - red; Δ := Δ - red end
        else begin Δ := Δ - ps[k]; ps[k] := 0 end;
    m := j;
``` end;
for k := 1 to K do $\Delta P_k^{tgt} := LSF_k - ps[k]$;

As can be derived from above, the power reduction distribution process S72 according to the fourth embodiment keeps track of $\Delta$, the amount of power still to be shed or reduced and p s[k], the potential shedding still left for the group k.

The power restoration distribution process S74 according to the fourth embodiment is performed in a similar way. For performing the steps of the power restoration distribution process S74 according to the fourth embodiment, in the above outlined steps of the power reduction distribution process S72 of the fourth embodiment $LSF_k$ is replaced by $LRF_k$ and $\Delta$ is initialized as $P_{sys}^{tgt}-P_{sys}$.

The power redistribution process S72 of a fifth embodiment is implemented as follows. The central controller 20 determines the index of the group with the highest load-shedding factor (say group k) and the index of the group with the next highest load-shedding factor (say group m). Subsequently, the central controller 20 schedules a reduction of the power consumption in group k by min($\Delta P_m^{tgt}(t)$, $\Delta P_{sys}^{tgt}$) and reduces the amount of power still to be shed with the same amount. This is repeated until the amount of power still to be shed equals 0, after which the power reductions for all groups are known. For further clarification, a pseudo-code description of the power redistribution process according to the fifth embodiment is provided below. The amount of power to be reduced by group k (k=1, 2 . . . , K) is equals the value of δ(k) after the execution of the pseudo-code below.

```
for k:=1 to K do δ(k):=0; Δ:=P_sys^tgt-P_sys
while Δ>0 do begin determine k such that LSF_k=max {LSF_j|1≤j≤K};
    determine m such that LSF_m=max {LSF_j|1≤j≤K, j≠k};
    δ:=min (LSF_m, Δ);
    δ(k):=δ(k)+δ; Δ:=Δ-δ
end;
```

The power restoration distribution process S74 of the fifth embodiment is implemented, performed similarly to the power reduction distribution process S72 of the fifth embodiment, wherein $\Delta P_k^{tgt}(t)=P_k^{max}(t)-P_k(t)$ and wherein instead of load or power consumption reduction or shedding a load or power consumption increasing or restoration is performed.

Figure 8:
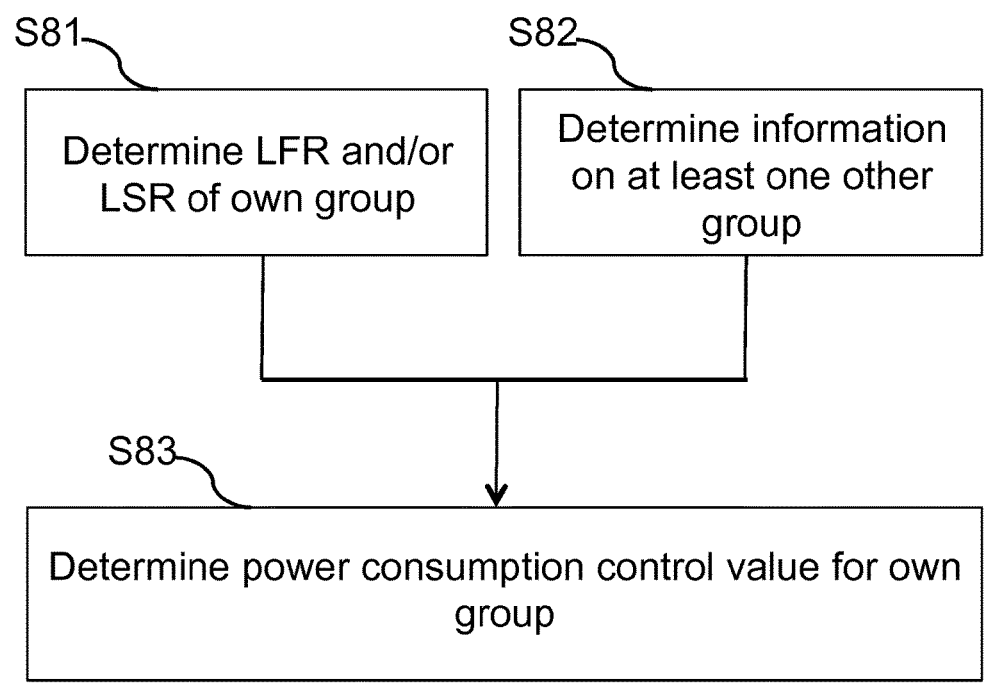
FIG. 8 illustrates steps of controlling power consumption in a lighting system performed according to an embodiment of the present invention.

FIG. 8 illustrates steps of controlling power consumption in a lighting system performed according to an embodiment of the present invention. Particularly, the present embodiment of FIG. 8 is provided with regard to the distributed architecture, as exemplary shown in FIG. 3. The steps of FIG. 8 may also be seen as steps performed with regard to a time instance t, wherein it is optional and not mandatory. Further, the steps of FIG. 8 may be performed by each group controller 31, 32, 33, 411 of a system of a distributed architecture.

In step S81, when a need for changing power consumption in the system with regard to a target system change value $\Delta P_{sys}^{tgt}$ has been determined (as described, for example, with regard to steps S506, S507 of FIG. 5 or with regard to step S600 of FIG. 6) by a group controller 31, 32, 33, 411, the group controller 31, 32, 33, 411 determines a load shedding flexibility value $LSF_{own}$ and/or a load shedding restoration value $LRF_{own}$ of its own group 21, 22, 23, 4, i.e. of a group 21, 22, 23, 4, which the group controller 31, 32, 33, 4 is controlling. The determining of step S81 may be performed as already described with regard to the centralized architecture handled in FIGS. 5 and 6. The group controller 31, 32, 33, 4 determines the control mode, by use of which his group 21, 22, 23, 4 is controlled at a time instance t, which may be, for example, a current or a predefined time instance. Then, the group controller 31, 32, 33, 4 uses the information stored in the determined control mode for determining at least one of the values $LSF_{own}$, $LTF_{own}$. Particularly, the group controller 31, 32, 33, 4 determines a minimum power consumption $P_k^{min}(t)$ and/or a maximum power consumption $P_k^{max}(t)$ of its group 21, 22, 23, 4 by use of maximum and/or minimum illumination levels and/or from maximum and/or minimum power consumption levels specified in the determined control mode and/or by use of further factors or information, which are specified in the determined control mode of its group 21, 22, 23, 4 and/or are determined with regard to its group 21, 22, 23, 4, for example, by a sensor unit 24. Such further factors of information may be the daylight level, for example, as already explained above with regard to FIG. 5. Then, in step S81, the group controller 31, 32, 33, 411 determines the current power consumption $P_k(t)$ in its group 21, 22, 23, 4, as explained with regard to step S502 of FIG. 5. Subsequently, the group controller 211 determines the load shedding flexibility value $LSF_{own}$ and/or the load restoration flexibility value $LRF_{own}$ of its own group 21, 22, 23, 4. As already explained with regard to step S503, to this, the group controller 31, 32, 33, 411 may, for example, derive or calculate the load shedding flexibility value $LSF_{own}$ as $LSF_{own}=P_k(t)-P_k^{min}(t)$ and/or the load restoration flexibility value $LRF_{own}$ as $LRF_{own}=P_k^{max}(t)-P_k(t)$.

In step S82, which may be performed independently on step S81 (i.e., before, after or in parallel to the step S81, for example), the group controller 31, 32, 33, 411 determines information on at least one other group 31, 32, 33, 4 of the lighting system. The other group 21, 22, 23, 4 may be, for example, a group 21, 22, 23, 4, to which the group controller 31, 32, 33, 411 has a communications connection and/or with regard to which the group controller 31, 32, 33, 411 can derive information.

Further, a combination of the above-discussed two embodiments may be implemented for deriving $LSF_m$ and/or $LRF_m$ values for at least one other group 21, 22, 23, 4.

Then, in step S83, the group controller 31, 32, 33, 411 determines the power consumption control value $\Delta P_{own}(t)$, by use of which the group controller will change the power consumption in its own group 21, 22, 23, 4, by use of the following equation:

$$\Delta P_{own}(t) = \frac{LSF_{own}}{\sum_{k=1}^{K} LSF_k} \Delta P_{sys}^{tgt}(t),$$

if power consumption shedding (i.e. reducing) has to be performed, or by use of the following equation:

$$\Delta P_{own}(t) = \frac{LRF_{own}}{\sum_{k=1}^{K} LRF_k} \Delta P_{sys}^{tgt}(t),$$

if power consumption restoration (i.e. increasing) has to be performed.

The values $\Sigma_{k=1}^{K} LSF_k$ and $\Sigma_{k=1}^{K} LRF_k$ are computed in a distributed manner by computing the average load flexibility values $\Sigma_{k=1}^{K} LSF_k/K$ and $\Sigma_{k=1}^{K} LRF_k/K$ are in a distributed manner (assuming that the number of groups K is known).

According to a further embodiment of the present invention, the group controller 31, 32, 33, 411 may implement an iteration algorithm for determining the corresponding value $lsf_k$ or $lrf_k$, estimate of the average load shedding flexibility and/or the average load restoration flexibility, respectively, where in an iteration n, the group controller 31, 32, 33, 411 computes the following in case of power consumption reducing or shedding, respectively:

$$lsf_k(n) = w_{kk}(n) lsf_k(n) + \sum_{m \in N} w_{km}(n) lsf_m(n),$$

and/or computes the following in case of power consumption restoration or increasing, respectively:

$$lrf_k(n) = w_{kk}(n) lrf_k(n) + \sum_{m \in N} w_{km}(n) lrf_m(n),$$

wherein $w_{kk}(n)$ and $w_{km}(n)$ are linear weight values at iteration n, which may be chosen in a variety of ways, as disclosed, for example, in L. Xiao, S. Boyd and S.-J. Kim, "Distributed Average Consensus with Least-Mean-Square Deviation", Journal of Parallel and Distributed Computing, 67(1): 33-46, 2007. N refers to the set of at least one other group controller 31, 32, 33, 411 with which k-th group controller 31, 32, 33, 411 can communicate.

Here, the value $lsf_k(n)$ converges to the average load shedding flexibility $\Sigma_{k=1}^{K} LSF_k/K$ and $lrf_k(n)$ converges to the average load restoration flexibility $\Sigma_{k=1}^{K} LRF_k/K$.

Figure 9:
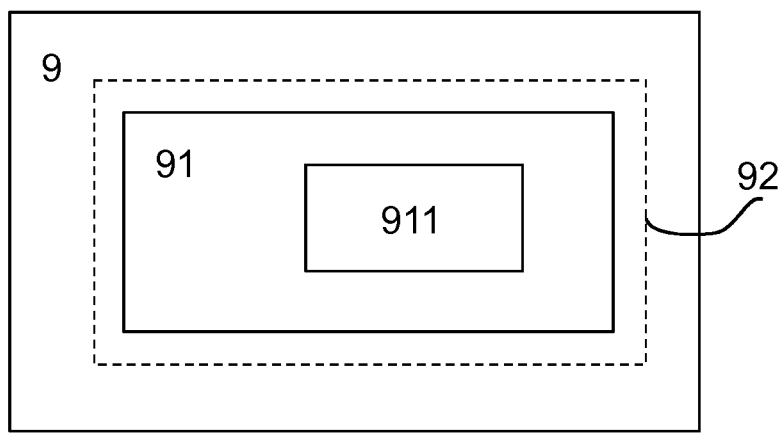
FIG. 9 illustrates an arrangement of a controlling device according to an embodiment of the present invention.

FIG. 9 illustrates an arrangement of a controlling device 9 according to an embodiment of the present invention. The controlling device 9 may correspond to the central controller 20 of FIG. 2 or to group controllers 31, 32, 33 of FIG. 5. According to the present embodiment the controlling device 9 comprises a computer program product 91, which comprises code 911 configured for performing the steps of the method of the present invention when run on a the controlling device 9. The controlling device 9 is configured for executing the computer program product 91. According to the present embodiment, the structure of the controlling device 9 is arranged or adapted such that it allows execution of the computer program product 91. The computer program product 91 may be incorporated in a correspondingly arranged hardware and/or software component arrangement 92 of the controlling device 9.

With regard to the above described embodiments of the present invention, it has to be pointed out that they are described exemplary and that in line with the present invention appropriate modifications, adaptations or extensions can be performed within the scope of the present invention as described and claimed. Some of them are provided exemplary below.

Thus, according to an embodiment of the present invention, the load or power consumption control may be applied in a periodic manner, or in an event-driven manner (e.g., due to a grid request), or in a combination of those.

Further, the grouping of power consuming devices can be performed also within a system having a more hierarchical structure. Thus, for example, a system may consist of several sub-systems, that in turn may be divided in groups of power consuming devices. For example, a whole system may refer to a lighting system for an office building, wherein its sub-systems may pertain to a floor or further rooms or areas of the building and wherein the groups of the corresponding sub-systems may correspond to regions of the floor or further rooms or areas of the building. The load or power consumption control requirements can be distributed over several sub-systems that subsequently distribute it over their groups. Further, different sub-systems may use different power reduction/restoration distribution algorithms.

According to an embodiment of the present invention, the central controller 20 may choose the algorithm to run based on, e.g., the amount of power changes to be distributed, which algorithms have been run before.

According to another embodiment of the present invention, the knowledge of the total load flexibility may be utilized further. For instance, the central controller 20 may also evaluate whether $$\Delta P_{sys}^{gt} > \sum_{k=1}^{K} LSF_k.$$

If it is the case, the controlled loads or controlled power consumptions alone cannot achieve the required load or power consumption reduction. Further actions, such as notifying the facility manager or notifying all facility users to reduce e.g. the plug loads consumption, may then be taken. According to a further embodiment, the load flexibility values may be used to determine how much load reduction can be offered in the load reduction bidding organized by e.g. a utility company. The same applies also to load or power consumption increasing or restoring.

By use of the controllers, methods and system described above, an automatic and dynamic controlling of power consumption of lighting systems is achieved, by which dynamic load management (e.g., demand response) services may be offered in a predictable and effective way in a smart grid.

Thus, the present invention relates to controlling the power consumption of a system comprising power consuming devices, some of which are controllable, some of which are not. Controllable devices are those which power consumption can be changed by the system proposed by the invention. The controllable devices can be lighting devices, heating, ventilation, air conditioning devices, etc., i.e. each device consuming power. The description of the present invention has been made exemplary with regard to lighting devices as controllable devices. However, the skilled person will be able to apply the described and claimed teaching of the present invention also to further power consuming devices.

Particularly, the invention relates to controlling power consumption of a group of plurality of groups of power consuming devices by determining power consumption control value for controlling power consumption of devices of the group by use of at least one of the following: load shedding flexibility value of at least one group of plurality of groups, wherein the load shedding flexibility value of the corresponding group indicates maximum amount of power, by which power consumption of devices of the corresponding group can be reduced such that minimum power consumption permissible in the corresponding group is maintained; load restoration flexibility value of the at least one group of plurality of groups, wherein the load restoration flexibility value of the corresponding group indicates maximum amount of power, by which the power consumption of devices of the corresponding group can be increased such that maximum power consumption permissible in the corresponding group is maintained.

It is obvious that the above-described embodiments can be combined in various ways. By means of the above described power consumption controlling, an efficient and effective power consumption control is provided, which enables an accurate, fast, flexible, and resource saving distribution of power changes by carefully considering user-acceptable service levels in several areas of the (lighting) system and the current and the permissible power consumption. An accurate power consumption control requires that not more than actually required power is reduced or increased and that optimal power consumption is derived, which allows for providing optimal illumination levels. Said accurate power consumption is achieved by the present invention.

The invention claimed is:

1. A controlling device configured to control power consumption of a given group of a plurality of groups of power consuming devices of a system of the power consuming devices, wherein the controlling device is adapted to determine a power consumption control value for controlling power consumption of devices of the given group by use of at least one of
    a load shedding flexibility value of at least one group of the plurality of groups, wherein the load shedding flexibility value of the corresponding group indicates a maximum amount of power, by which power consumption of devices of the corresponding group can be reduced such that a minimum power consumption permissible in the corresponding group is maintained; or
    a load restoration flexibility value of the at least one group of the plurality of groups, wherein the load restoration flexibility value of the corresponding group indicates a maximum amount of power, by which the power consumption of devices of the corresponding group can be increased such that a maximum power consumption permissible in the corresponding group is maintained.

2. The controlling device according to claim 1, wherein the controlling device is configured to determine the power consumption control value such that, when changing power consumption of the given group by use of the power consumption control value, a difference between a current power consumption amount in the system and a target system power consumption amount, to which the power consumption in the system is intended to be changed, is minimized.

3. The controlling device according to claim 1, wherein the controlling device is a central controller configured to control power consumption of the plurality of groups or is a group controller configured to control power consumption of the given group.

4. The controlling device according to claim 3, wherein if the controlling device is a group controller, the controlling device is configured to:
    determine information related to the load shedding flexibility value and/or information related to the load restoration flexibility value of the given group controlled by the group controller; and/or
    estimate or receive an average or a sum of the load shedding flexibility values and/or of the load restoration flexibility values of the at least one other group.

5. The controlling device according to claim 3, wherein:
if the controlling device is the central controller, the controlling device is configured to determine for each group of the plurality of groups a corresponding power consumption control value for controlling power consumption of devices of the corresponding group by use of at least one of the following: the load shedding flexibility values or the load restoration flexibility values of the plurality of groups, wherein the corresponding power consumption control values of the plurality of groups are determined such that a corresponding power shedding in the corresponding group is equal or less the corresponding load shedding flexibility value of the corresponding group or a corresponding power restoration in the corresponding group is equal or less the corresponding load restoration flexibility value of the corresponding group;
if the controlling device is the group controller, the power consumption control value of the given group is determined by the controlling device based on its own load shedding flexibility value or load restoration flexibility value and based on target system power consumption change value and based on an estimate of a sum of load shedding flexibility values or load restoration flexibility values of other groups of the system.

6. The controlling device according to claim 5, wherein, if the controlling device is the central controller, the corresponding power consumption control values of the plurality of groups are determined such that a change of power consumption of each of the plurality of groups by the corresponding power consumption control value results in a power consumption change of the system, which corresponds to the target system power change value.

7. The controlling device according to claim 1, wherein the controlling device is configured to:
receive from the at least one of the plurality of groups information related to the load shedding flexibility value of the corresponding group and/or information related to the load restoration flexibility value of the corresponding group; and/or
transmit to the at least one of the plurality of groups a request message requesting transmitting the information related to the load shedding flexibility value of the corresponding group and/or information related to the load restoration flexibility value of the corresponding group.

8. The controlling device according to claim 3, wherein, if the controlling device is the central controller, the controlling device is configured to determine for the at least one of the plurality of groups the load shedding flexibility value by use of information related to the load shedding flexibility value and/or the load restoration flexibility value by use of information related to the load restoration flexibility value.

9. The controlling device according to claim 3, wherein:
if the controlling device is the central controller, the controlling device is configured to transmit to the given group the power consumption control value for controlling power consumption of devices of the given group;
if the controlling device is the group controller, the controlling device is configured to control the power consumption of devices of the given group by use of the determined corresponding power consumption control value.

10. The controlling device according to claim 1, wherein the power consumption control value of the given group comprises at least one of following:
a value indicating the target power consumption in the given group;
a value indicating how much the power consumption in the given group is to be reduced or increased;
a factor value, which:
multiplied with the load shedding flexibility value of the given group results in a value indicating how much the power consumption in the given group is to be reduced or
multiplied with the load restoration flexibility value of the given group results in a value indicating how much the power consumption in the given group is to be increased;
an operating parameter indicating how each of the power consuming devices in the given group should be operated.

11. The controlling device according to claim 1, wherein the controlling device is configured to transmit:
a message indicating that a target system power change value, by which power consumption in the system is intended to be reduced, cannot be achieved in such a way that for each of the at least one group of the plurality of groups the corresponding minimum power consumption permissible in the corresponding group is maintained, and/or
a message indicating that the target system power change value, by which power consumption in the system is intended to be increased, cannot be achieved in such a way that for each of the at least one group of the plurality of groups the corresponding maximum power consumption permissible in the corresponding group is maintained.

12. A power control system comprising the controlling device and the plurality of groups according to claim 1.

13. A method for controlling power consumption of a given group of a plurality of groups of power consuming devices of a system of the power consuming devices, wherein the method comprises determining a power consumption control value for controlling power consumption of devices of the given group by use of at least one of the following:
a load shedding flexibility value of at least one group of the plurality of groups, wherein the load shedding flexibility value of the corresponding group indicates a maximum amount of power, by which power consumption of devices of the corresponding group can be reduced such that a minimum power consumption permissible in the corresponding group is maintained;
a load restoration flexibility value of the at least one group of the plurality of groups, wherein the load restoration flexibility value of the corresponding group indicates a maximum amount of power, by which the power consumption of devices of the corresponding group can be increased such that a maximum power consumption permissible in the corresponding group is maintained.

14. A computer program product comprising a computer readable non-transitory medium storing code configured for performing the steps of the method according to claim 13 when run on a device configured for executing the code.

15. The power control system according to claim 12, wherein the power control value is a factor value, and wherein each group of the plurality of groups is configured to apply the factor value to the respective load shedding flexibility value of the respective group such that each group of the plurality of groups reduces power consumption of the respective group by a same proportion of the respective load shedding flexibility value of the respective group or each group of the plurality of groups is configured to apply the factor value to the respective load restoration flexibility value of the respective group such that each group of the plurality of groups increases power consumption of the respective group by the same proportion of the respective load restoration flexibility value of the respective group.

16. The power control system according to claim 12, wherein at least one respective group of the plurality of groups is configured to reduce power consumption of the respective group such that any difference between the respective load shedding flexibility values of the plurality of groups is minimized and/or the at least one respective group of the plurality of groups is configured to increase power consumption of the respective group such that any difference between the respective load restoration flexibility values of the plurality of groups is minimized.

17. The method according to claim 13, wherein the power control value is a factor value, and wherein the method further comprises:
applying the factor value to the respective load shedding flexibility value of each group of the plurality of groups such that each group of the plurality of groups reduces power consumption of the respective group by a same proportion of the respective load shedding flexibility value of the respective group; or
applying the factor value to the respective load restoration flexibility value of each group of the plurality of groups such that each group of the plurality of groups increases power consumption by the same proportion of the respective load restoration flexibility value of the respective group.

18. The method according to claim 13, further comprising:
reducing power consumption of at least one respective group of the plurality of groups such that any difference between the respective load shedding flexibility values of the plurality of groups is minimized; and/or
increasing power consumption of the at least one respective group of the plurality of groups such that any difference between the respective load restoration flexibility values of the plurality of groups is minimized.

19. A power control system, comprising:
a controlling device configured to control power consumption of a given group of a plurality of groups of power consuming devices of a system of the power consuming devices, wherein the controlling device is adapted to determine a power consumption control value for controlling power consumption of devices of the given group by use of at least one of
a load shedding flexibility value of at least one group of the plurality of groups, wherein the load shedding flexibility value of the corresponding group indicates a maximum amount of power, by which power consumption of devices of the corresponding group can be reduced such that a minimum power consumption permissible in the corresponding group is maintained, or
a load restoration flexibility value of the at least one group of the plurality of groups, wherein the load restoration flexibility value of the corresponding group indicates a maximum amount of power, by which the power consumption of devices of the corresponding group can be increased such that a maximum power consumption permissible in the corresponding group is maintained; and
the plurality of groups of power consuming devices, wherein at least one respective group of the plurality of groups is configured to reduce power consumption of the respective group based on a proportion defined by a ratio of the respective load shedding flexibility value of the respective group to a sum of the load shedding flexibility values of the plurality of groups and/or the at least one respective group of the plurality of groups is configured to increase power consumption of the respective group based on a proportion defined by a ratio of the respective load restoration flexibility value of the respective group to a sum of the load restoration flexibility values of the plurality of groups.

20. A method for controlling power consumption of a given group of a plurality of groups of power consuming devices of a system of the power consuming devices, wherein the method comprises determining a power consumption control value for controlling power consumption of devices of the given group by use of at least one of the following:
a load shedding flexibility value of at least one group of the plurality of groups, wherein the load shedding flexibility value of the corresponding group indicates a maximum amount of power, by which power consumption of devices of the corresponding group can be reduced such that a minimum power consumption permissible in the corresponding group is maintained;
a load restoration flexibility value of the at least one group of the plurality of groups, wherein the load restoration flexibility value of the corresponding group indicates a maximum amount of power, by which the power consumption of devices of the corresponding group can be increased such that a maximum power consumption permissible in the corresponding group is maintained,
wherein the method further comprises:
reducing power consumption of at least one respective group of the plurality of groups based on a proportion defined by a ratio of the respective load shedding flexibility value of the respective group to a sum of the load shedding flexibility values of the plurality of groups; and/or
increasing power consumption of the at least one respective group of the plurality of groups based on a proportion defined by a ratio of the respective load restoration flexibility value of the respective group to a sum of the load restoration flexibility values of the plurality of groups.

* * * * *